US011437902B2

(12) United States Patent
Brinkmann et al.

(10) Patent No.: US 11,437,902 B2
(45) Date of Patent: Sep. 6, 2022

(54) STATOR MODULE AND PLANAR DRIVE SYSTEM

(71) Applicant: Beckhoff Automation GmbH, Verl (DE)

(72) Inventors: Rolf Brinkmann, Bad Salzuflen (DE); Lukas Bentfeld, Delbrueck (DE); Uwe Pruessmeier, Lemgo (DE)

(73) Assignee: Beckhoff Automation GmbH, Verl (DE)

( * ) Notice: Subject to any disclaimer, the term of this patent is extended or adjusted under 35 U.S.C. 154(b) by 134 days.

(21) Appl. No.: 16/896,650

(22) Filed: Jun. 9, 2020

(65) Prior Publication Data

US 2020/0304010 A1 Sep. 24, 2020

Related U.S. Application Data

(63) Continuation of application No. PCT/EP2018/085780, filed on Dec. 19, 2018.

(30) Foreign Application Priority Data

Dec. 27, 2017 (DE) ...................... 10 2017 131 304.4

(51) Int. Cl.
*H02K 41/03* (2006.01)

(52) U.S. Cl.
CPC ....... *H02K 41/031* (2013.01); *H02K 2201/18* (2013.01)

(58) Field of Classification Search
CPC .. H02K 11/33; H02K 41/031; H02K 2201/18; B65G 54/02; B65G 37/02
(Continued)

(56) References Cited

U.S. PATENT DOCUMENTS 4,126,797 A * 11/1978 Kling ..................... H02K 41/03
310/46
4,458,227 A * 7/1984 Petersen ............... H01F 7/1646
396/464
(Continued)

FOREIGN PATENT DOCUMENTS

CN 103441708 A 12/2013
CN 104518639 A 4/2015
(Continued)

OTHER PUBLICATIONS

Examination Report dated Nov. 15, 2018 for German patent application No. DE102017131304.4, 16 pages including machine translation.
(Continued)

*Primary Examiner* — Alex W Mok
(74) *Attorney, Agent, or Firm* — Dorsey & Whitney LLP

(57) ABSTRACT

A stator module for two-dimensionally driving a rotor having first and second magnet units comprises a stator assembly including first and second stator segments for interacting with drive magnets of the first and second magnet units. The individual stator segments may each be energized independently from the remaining stator segments. The stator assembly comprises first, second, third and fourth stator sectors. The first stator segments of the individual stator sectors each extend in a second direction over all second stator segments of the relevant stator sector arranged side by side, and the second stator segments of the individual stator sectors each extend in a first direction over all first stator segments of the relevant stator sector arranged side by side. Extensions of the stator sectors in the first and second directions are respectively smaller than extensions of a magnet arrangement comprising the magnet units.

19 Claims, 15 Drawing Sheets

(58) Field of Classification Search
USPC .................................................... 310/12.05
See application file for complete search history.

(56) References Cited

U.S. PATENT DOCUMENTS

| | | | |
|---|---|---|---|
| 6,226,073 B1 | 5/2001 | Emoto | |
| 6,353,273 B1 | 3/2002 | Heshmat et al. | |
| 6,445,093 B1 | 9/2002 | Binnard | |
| 9,202,719 B2* | 12/2015 | Lu | H02K 3/28 |
| 10,116,195 B2 | 10/2018 | Lu | |
| 11,038,410 B2 | 6/2021 | Brinkmann et al. | |
| 2003/0192686 A1 | 10/2003 | Hisai et al. | |
| 2006/0220478 A1 | 10/2006 | Emoto | |
| 2012/0098391 A1 | 4/2012 | Yamasaki et al. | |
| 2012/0156898 A1 | 6/2012 | Kallee | |
| 2012/0307476 A1 | 12/2012 | Masuzawa et al. | |
| 2012/0328836 A1 | 12/2012 | Binnad et al. | |
| 2013/0069449 A1 | 3/2013 | Pharand et al. | |
| 2013/0164687 A1 | 6/2013 | Binnard et al. | |
| 2013/0278087 A1 | 10/2013 | Kimiabeigi | |
| 2014/0062236 A1 | 3/2014 | Taniguchi et al. | |
| 2014/0285122 A1* | 9/2014 | Lu | H02K 7/09 318/135 |
| 2015/0097498 A1 | 4/2015 | Hemati et al. | |
| 2015/0369216 A1 | 12/2015 | Kisovec | |
| 2016/0099623 A1 | 4/2016 | Bóhm et al. | |
| 2016/0241173 A1 | 8/2016 | Prüssmeier et al. | |
| 2016/0254722 A1 | 9/2016 | Yamamoto et al. | |
| 2017/0163140 A1* | 6/2017 | Lu | H02K 41/031 |
| 2017/0179805 A1* | 6/2017 | Lu | H02P 8/00 |
| 2017/0179806 A1* | 6/2017 | Lu | H02K 41/03 |
| 2018/0205304 A1 | 7/2018 | Lu | |
| 2018/0212505 A1 | 7/2018 | Ding | |
| 2020/0303997 A1 | 9/2020 | Brinkmann et al. | |
| 2020/0304007 A1 | 9/2020 | Brinkmann et al. | |
| 2020/0304008 A1 | 9/2020 | Brinkmann et al. | |
| 2020/0304009 A1 | 9/2020 | Brinkmann et al. | |
| 2020/0321846 A1 | 10/2020 | Brinkmann et al. | |
| 2021/0091621 A1 | 3/2021 | Brinkmann et al. | |
| 2021/0091622 A1 | 3/2021 | Brinkmann et al. | |
| 2021/0184612 A1 | 6/2021 | Prüssmeier | |
| 2022/0131426 A1 | 4/2022 | Prüssmeier | |

FOREIGN PATENT DOCUMENTS

| | | |
|---|---|---|
| CN | 104753307 A | 7/2015 |
| DE | 102016208155 A1 | 11/2017 |
| DE | 102018117981 A1 | 1/2020 |
| DE | 102019117430 A1 | 12/2020 |
| DE | 102019117431 A1 | 12/2020 |
| WO | 2013059934 A1 | 5/2013 |
| WO | 2015017933 A1 | 2/2015 |
| WO | 2015179962 A1 | 12/2015 |
| WO | 2015184553 A1 | 12/2015 |
| WO | 2015188281 A1 | 12/2015 |
| WO | 2017004716 A1 | 1/2017 |
| WO | 2019129547 A1 | 7/2019 |
| WO | 2019129561 A1 | 7/2019 |
| WO | 2019129562 A1 | 7/2019 |
| WO | 2019129564 A1 | 7/2019 |
| WO | 2019129566 A1 | 7/2019 |
| WO | 2019129576 A1 | 7/2019 |
| WO | 2020020605 A1 | 1/2020 |
| WO | 2020020607 A1 | 1/2020 |
| WO | 2020260566 A1 | 12/2020 |

OTHER PUBLICATIONS

International Preliminary Report on Patentability dated Dec. 4, 2019 for International Patent Application No. PCT/EP2018/085780, 39 pages including machine translation.

International Search Report and Written Opinion dated Mar. 22, 2019 for International Patent Application No. PCT/EP2018/085780, 25 pages including machine translation.

Office Action dated Jan. 12, 2021 in connection with Chinese patent application No. 201880062405.4, 12 pages including English translation.

* cited by examiner

STATOR MODULE AND PLANAR DRIVE SYSTEM

CROSS-REFERENCE TO RELATED APPLICATIONS

This application is a continuation of International Patent Application PCT/EP2018/085780, filed Dec. 19, 2018, entitled STATOR MODULE, which claims the priority of German patent application DE 10 2017 131 304.4, filed Dec. 27, 2017, entitled STATORMODUL, each of which is incorporated by reference herein, in the entirety and for all purposes.

FIELD

The present invention relates a stator module for driving a rotor of a planar drive system and to a planar-drive system.

BACKGROUND

Planar drive systems may, inter alia, be used in automation technology, in particular in manufacturing technology, handling technology and process engineering. With planar-drive systems, a moving element of a plant or machine may be moved or positioned in at least two linearly independent directions. Planar-drive systems may comprise a permanently energized electromagnetic planar motor having a planar stator and a rotor which is moveable in at least two directions on the stator.

In a permanently energized electromagnetic planar motor, a driving force is exerted on the rotor by current-carrying conductors magnetically interacting with drive magnets of a magnet arrangement. The present invention particularly relates to embodiments of planar drive systems in which the drive magnets of an electric planar motor are arranged on the rotor and the current-carrying conductors of the planar motor are arranged in a stationary planar stator.

In such a drive system, the rotor comprises at least a first magnet unit for driving the rotor in a first direction and a second magnet unit for driving the rotor in a second direction linearly independent from the first direction, for example in a second direction orthogonal to the first direction. The planar stator comprises at least one set of first energizable conductors which magnetically interacts with the magnets of the first magnet unit in order to drive the rotor in the first direction, as well as a set of second energizable conductors which magnetically interact with the magnets of the second magnet unit to drive the rotor in the second direction. The first and second groups of conductors are generally independently energizable to allow for independent movement of the rotor in the first and second direction. If the conductors of the first and second set may be energized independently from each other at least in parts, several rotors may be moved independently from each other on one stator at the same time.

The publications WO 2013/059934 A1, WO 2015/017933 A1, WO 2015/179962 A1, WO 2015/184553 A1, WO 2015/188281 A1, WO 2017/004716 A1 each describe planar drive systems (displacement devices) which comprise an electromagnetic planar motor with a permanently energized rotor and a stator comprising several current-carrying conductors.

SUMMARY

The present invention provides an improved stator module and an improved planar drive system.

According to an aspect, a planar-drive system comprises a stator module and a rotor. The rotor comprises a magnet arrangement, the magnet arrangement having at least one first magnet unit and at least one second magnet unit. The first magnet unit comprises elongated drive magnets arranged side by side in a first rotor direction and extending along a second rotor direction having a perpendicular orientation with regard to the first rotor direction. The second magnet unit comprises elongated drive magnets arranged side by side in the second rotor direction and extending along the first rotor direction. The stator module has a stator assembly with at least one stator sector, which in a first stator layer comprises first stator segments for interacting with the drive magnets of the first magnet unit and in a second stator layer arranged below the first stator layer comprises second stator segments for interacting with the drive magnets of the second magnet unit. The first stator segments comprise elongated conductor strips arranged side by side along a first direction and extending along a second direction oriented perpendicular to the first direction. The second stator segments have elongated conductor strips arranged side by side along the second direction and extended along the first direction. The conductor strips of the individual stator segments may be energized independently from the conductor strips of the other stator segments. The first stator segments of the stator sector extend in the second direction over all second stator segments of the stator sector arranged side by side and the second stator segments of the stator sector extend in the first direction over all first stator segments of the stator sector arranged side by side. A sector width of the stator sector in the first direction is smaller than an extension of the magnet arrangement in the first rotor direction and a sector length of the stator sector in the second direction is smaller than an extension of the magnet arrangement in the second rotor direction.

According to a further aspect, a stator module for driving a rotor, which comprises a first magnet unit having elongated drive magnets arranged side by side in a first rotor direction and extending along a second rotor direction oriented perpendicularly to the first rotor direction, and a second magnet unit having elongated drive magnets arranged side by side in the second rotor direction and extending along the first rotor direction, comprises a stator assembly. The stator assembly comprises a first stator sector, a second stator sector, a third stator sector and a fourth stator sector. The stator sectors each comprise first stator segments in a first stator layer for interacting with the drive magnets of the first magnet unit and second stator segments in a second stator layer arranged below the first stator layer for interacting with the drive magnets of the second magnet unit. The first stator segments comprise elongated conductor strips arranged side by side along a first direction and extending along a second direction oriented perpendicular to the first direction, and the second stator segments have elongated conductor strips arranged side by side along the second direction and extending along the first direction. The conductor strips of the individual stator segments may each be energized independently from the conductor strips of the other stator segments. The first stator segments of the first, second, third and fourth stator sectors respectively extend in the second direction over all the second stator segments of the first, second, third and fourth stator sectors arranged next to one another. The second stator segments of the first, second, third and fourth stator sectors respectively extend in the first direction respectively over all the first stator segments of the first, second, third and fourth stator sectors arranged next to one another. In the first stator layer, the stator sectors consist of three first stator segments which may be energized independently from one another and in the second stator layer of three second stator segments which may be energized independently from one another.

According to a further aspect, a planar-drive system comprises a stator module and a rotor. The rotor comprises a magnet arrangement. The magnet arrangement comprises at least one first magnet unit and at least one second magnet unit. The first magnet unit comprises elongated drive magnets arranged side by side in a first rotor direction and extending along a second rotor direction oriented perpendicularly to the first rotor direction. The second magnet unit comprises elongated drive magnets arranged side by side in the second rotor direction and extended along the first rotor direction. The stator module comprises a stator assembly having at least one stator sector which, in a first stator layer, has first stator segments for interaction with the drive magnets of the first magnet unit and, in a second stator layer arranged below the first stator layer, second stator segments for interacting with the drive magnets of the second magnet unit. The first stator segments comprise elongated conductor strips arranged side by side along a first direction and extending along a second direction oriented perpendicularly to the first direction. The second stator segments comprise elongated conductor strips arranged side by side along the second direction and extending along the first direction. The conductor strips of the individual stator segments may each be energized independently from the conductor strips of the remaining stator segments. The first stator segments of the stator sector in the second direction extend over all second stator segments of the stator sector arranged side by side. The second stator segments of the stator sector in the first direction extend over all the first stator segments of the stator sector arranged side by side. A sector width of the stator sector is in the first direction smaller than an extension of the magnet arrangement in the first rotor direction. A sector length of the stator sector is in the second direction smaller than an extension of the magnet arrangement in the second rotor direction. The stator sector in the first stator layer consists of three first stator segments which may be energized independently from one another and in the second stator layer consists of three second stator segments which may be energized independently from one another. A segment width of the first stator segments in the first direction corresponds to a magnetizing period of the first magnet unit. A segment width of the second stator segments in the second direction corresponds to a magnetizing period of the second magnet unit. The segment width of the first stator segments is in the second direction three times the magnetizing period of the first magnet unit. The segment width of the second stator segments is in the first direction three times the magnetizing period of the second magnet unit.

EXEMPLARY EMBODIMENTS

A planar drive system comprises a stator module and a rotor. The rotor comprises a magnet arrangement, the magnet arrangement having at least one first magnet unit and at least one second magnet unit. The first magnet unit comprises elongated drive magnets arranged side by side in a first rotor direction and extending along a second rotor direction having a perpendicular orientation with regard to the first rotor direction. The second magnet unit comprises elongated drive magnets arranged side by side in the second rotor direction and extending along the first rotor direction. The stator module has a stator assembly with at least one stator sector, which in a first stator layer comprises first stator segments for interacting with the drive magnets of the first magnet unit and in a second stator layer arranged below the first stator layer comprises second stator segments for interacting with the drive magnets of the second magnet unit. The first stator segments comprise elongated conductor strips arranged side by side along a first direction and extending along a second direction oriented perpendicular to the first direction. The second stator segments have elongated conductor strips arranged side by side along the second direction and extended along the first direction. The conductor strips of the individual stator segments may be energized independently from the conductor strips of the other stator segments. The first stator segments of the stator sector extend in the second direction over all second stator segments of the stator sector arranged side by side and the second stator segments of the stator sector extend in the first direction over all first stator segments of the stator sector arranged side by side. A sector width of the stator sector in the first direction is smaller than an extension of the magnet arrangement in the first rotor direction and a sector length of the stator sector in the second direction is smaller than an extension of the magnet arrangement in the second rotor direction.

In such a planar-drive system, the area of the stator module to be energized for driving the rotor may be adjusted particularly well to the size of the magnet arrangement. In particular, an area of the stator that is not covered by the magnet arrangement but is still energized when the rotor is driven may be kept small. For example, the energized area not covered by the magnet arrangement may be limited in the first and second direction to the extent of the magnet arrangement in the first or, respectively, second rotor direction.

In a further embodiment of the planar-drive system, the stator sector in the first stator layer consists of three first stator segments that may be energized independently from one another and in the second stator layer of three second stator segments that may be energized independently from one another. In such a planar-drive system, in particular when driving a rotor by a magnet arrangement which has a width of essentially three magnetizing periods in both rotor directions, both the number of stator segments to be energized independently from one another and the stator area to be energized instantaneously may be kept small.

In a further embodiment of the planar-drive system, a segment width of the first stator segments in the first direction corresponds to a magnetizing period of the first magnet unit and a segment width of the second stator segments in the second direction corresponds to a magnetizing period of the second magnet unit. As a result, energizing of the conductor strips of the first stator segments arranged side by side along the first direction may be varied in multiples of the magnetizing period of the first magnet unit and energizing of the conductor strips of the second stator segments arranged side by side along the second direction may be varied in multiples of the magnetizing period of the second magnet unit. In this way, the number of conductor strips that must be energized simultaneously when the rotor moves may be kept small. This reduces the energy required to drive the rotor and the heat loss that occurs when driving the rotor. In addition, two rotors driven independently from each other above the stator assembly may come particularly close to each other without one rotor interacting with the conductor strips driving the other rotor.

In a further embodiment of the planar-drive system, the segment width of the first stator segments in the second direction corresponds to three times the magnetizing period of the first magnet unit and the segment width of the second stator segments in the first direction corresponds to three times the magnetizing period of the second magnet unit. In this way, the number of stator segments that have to be energized simultaneously when the rotor moves may be kept small.

In a further embodiment of the planar-drive system, a conductor period between the conductor strips of the first stator segments corresponds to one-sixth of a magnetizing period of the first magnet unit and a conductor period of the conductor strips of the second stator segments corresponds to one-sixth of a magnetizing period of the second magnet unit.

In such stator segments, the conductor strips of a stator segment may each be connected to one another to form a three-phase system with a common neutral point and be supplied with current from a common three-phase current-generating unit. The stator segment may thus be operated with a small number of current-generating units.

In a further embodiment of the planar-drive system, an extension of the first magnet unit in the first rotor direction corresponds to a magnetizing period of the first magnet unit and an extension of the second magnet unit in the second rotor direction corresponds to a magnetizing period of the second magnet unit. Thus, on the one hand, a relatively large force may be exerted onto the rotor and, on the other hand, the magnet arrangement may have relatively compact dimensions.

In a further embodiment of the planar-drive system, the stator sector has a square embodiment so that the sector width of the stator sector in the first direction corresponds to the sector length of the stator sector in the second direction. As a result, a plurality of stator modules may be strung together in both the first and second direction in a simple manner.

In a further embodiment of the planar-drive system, an outer edge of the stator sector is flush with an outer edge of the stator module, so that the stator sector and a stator sector of the further stator module that is flush with an outer edge of a further stator module arranged beside to the stator module, may be arranged adjacently to each other. In such a planar-drive system, a gapless, continuous stator surface may be created by a continuously adjacent arrangement of a plurality of stator modules over which the rotor may move without interruption.

In a further embodiment of the planar-drive system, the stator assembly comprises three further stator sectors, where-in the first direction and in the second direction the stator sector and the further stator sectors of the stator assembly are each arranged in two rows next to one another and adjoining one another, and wherein the further stator sectors each comprise further ones of the first and second stator segments, respectively, in the first and second stator layer.

Arranging a plurality of stator sectors in a stator assembly of a single stator module has the effect that a shared activation-control electronics in the stator module may be used in order to electronically control the stator segments of the individual stator sectors. It is therefore not necessary to provide separate activation-control electronics for each of the individual stator sectors. In addition, the activation-control electronics of all stator sectors of the stator module may be connected to a superordinate control system and/or to a shared power supply by a common line.

A stator module for driving a rotor, which comprises a first magnet unit having elongated drive magnets arranged side by side in a first rotor direction and extending along a second rotor direction oriented perpendicularly to the first rotor direction, and a second magnet unit having elongated drive magnets arranged side by side in the second rotor direction and extending along the first rotor direction, comprises a stator assembly. The stator assembly comprises a first stator sector, a second stator sector, a third stator sector and a fourth stator sector. The stator sectors each comprise first stator segments in a first stator layer for interacting with the drive magnets of the first magnet unit and second stator segments in a second stator layer arranged below the first stator layer for interacting with the drive magnets of the second magnet unit. The first stator segments comprise elongated conductor strips arranged side by side along a first direction and extending along a second direction oriented perpendicular to the first direction, and the second stator segments have elongated conductor strips arranged side by side along the second direction and extending along the first direction. The conductor strips of the individual stator segments may each be energized independently from the conductor strips of the other stator segments. The first stator segments of the first, second, third and fourth stator sectors respectively extend in the second direction over all the second stator segments of the first, second, third and fourth stator sectors arranged next to one another. The second stator segments of the first, second, third and fourth stator sectors respectively extend in the first direction respectively over all the first stator segments of the first, second, third and fourth stator sectors arranged next to one another. In the first stator layer, the stator sectors consist of three first stator segments which may be energized independently from one another and in the second stator layer of three second stator segments which may be energized independently from one another.

Two stator segments may be energized independently from one another only if all conductor strips of one stator segment on the stator assembly are electrically insulated from all conductor strips of the other stator segment. In particular, the stator segments that may be energized independently from one another do not include any conductor strips that are electrically connected to one another on the stator assembly. In addition, all connections of the stator assembly, via which the conductor strips of one stator segment may be contacted, are electrically insulated from all connections of the stator assembly, via which the conductor strips of the other stator segment may be contacted. This does not exclude that the two stator segments or the connections of the conductor strips of the stator segments on other units, modules or components of the stator module, for example on a power module of the stator module, are electrically connected to each other in a conductive manner.

By dividing up the stator assembly into four stator sectors, each with independently energizable stator segments, the rotor may be efficiently driven by the stator assembly. In particular, only those stator segments in the proximity of which the rotor is located need to be energized at any given time. By energizing the stator segments independently from each other, a plurality of rotors may also be moved independently from each other in a planar-drive system comprising the stator module.

An arrangement of a plurality of stator sectors on a stator module moreover has the effect that a shared activation electronics may be used in the stator module to electronically control the stator segments of the individual stator sectors. It is therefore not necessary to provide separate control electronics for each of the individual stator sectors. In addition, the activation electronics of all stator sectors of the stator module may be connected to a superordinate control system and/or to a shared power supply by a shared line.

In a further embodiment of the stator module, the first stator segments each comprise six conductor strips arranged side by side and the second stator segments also each comprise six conductor strips arranged side by side. In such stator segments, the conductor strips of the individual stator segments may each be interconnected to form a three-phase system with a shared neutral point and be supplied with power by a shared three-phase current-generating unit. The stator segment may thus be operated with a small number of current-generating units.

In a further embodiment of the stator module, the conductor strips of the first stator segments are each interconnected to form three-phase systems with a shared neutral point for each first stator segment, and the conductor strips of the second stator segments are also each interconnected to form three-phase systems with a shared neutral point for each second stator segment. The three-phase systems of the individual first and second stator segments may be energized independently from each other. In such a stator module, the conductor strips may be energized with a small number of current-generating units.

In a further embodiment of the stator module, an outer edge of the first stator sector is flush with a first outer edge of the stator module and a further outer edge of the first stator sector is flush with a second outer edge of the stator module. An outer edge of the second stator sector is flush with the first outer edge of the stator module and an outer edge of the third stator sector is flush with the second outer edge of the stator module.

This allows for arranging the first stator sector of the stator module immediately adjacent to a first further stator sector of a first further stator module and immediately adjacent to a second further stator sector of a second further stator module by arranging the first further stator module adjacent to the first outer edge of the stator module and the second further stator module adjacent to the second outer edge of the stator module. By seamlessly joining several stator modules in this way, a continuous stator surface may be created, in which the stator sectors are also arranged adjacent to each other across module boundaries and the rotor may move over the stator surfaces of all stator modules without interruption.

In a further embodiment of the stator module, the stator assembly consists of the first, second, third and fourth stator sectors. A further outer edge of the third stator sector and an outer edge of the fourth stator sector are flush with a third outer edge of the stator module. A further outer edge of the second stator sector and a further outer edge of the fourth stator sector are flush with a fourth outer edge of the stator module.

In particular, the first stator sector, the second stator sector, the third stator sector and the fourth stator sector may at their two outer edges each be flush with one of the outer edges of the stator module and the entire surface of the stator module may be covered by the stator sectors without gaps. This means that the entire surface of the stator module may also be completely covered by the stator segments provided for the electromagnetic drive of the rotor, so that an unbroken power transmission to the rotor is possible over the entire surface of the stator module. A plurality of stator modules in which the stator sectors each cover the entire surface of the stator module may be arranged one after the other and thus form a closed working surface for the movement of the rotor without gaps.

In a further embodiment of the stator module, a sector width of the stator sectors in the first direction is smaller than an extension of a magnet arrangement of the rotor comprising the first and second magnet unit in the first rotor direction and a sector length of the stator sectors in the second direction is smaller than an extension of the magnet arrangement in the second rotor direction.

This means that in a planar drive system comprising the stator module, the area to be supplied with current for driving the rotor may be adapted particularly well to the size of the magnet arrangement. In particular, an area of the stator that is not covered by the magnet arrangement but still needs to be energized to drive the rotor may be kept small. For example, the current carrying area not covered by the magnet arrangement in the first and second direction may be limited to the extent of the magnet arrangement in the first and second rotor direction.

In a further embodiment of the stator assembly, a segment width of the first stator segments in the first direction corresponds to a magnetizing period of the first magnet unit and a segment width of the second stator segments in the second direction corresponds to a magnetizing period of the second magnet unit. This allows the current supply to the conductor strips of the first stator segments arranged side by side along the first direction to be varied in multiples of the magnetizing period of the first magnet unit and the current supply to the conductor strips of the second stator segments arranged side by side along the second direction to be varied in multiples of the magnetizing period of the second magnet unit. As a result, the number of conductor strips which have to be energized simultaneously when the rotor moves may be kept small.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The invention relates to further developments of the planar drive systems disclosed in publications WO 2013/059934 A1, WO 2015/017933 A1, WO 2015/179962 A1, WO 2015/184553 A1, WO 2015/188281 A1 and WO 2017/004716 A1. The disclosure and content of each of the above-mentioned publications is incorporated by reference in its entirety, and is also subject matter of this description by reference.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Figure 1:
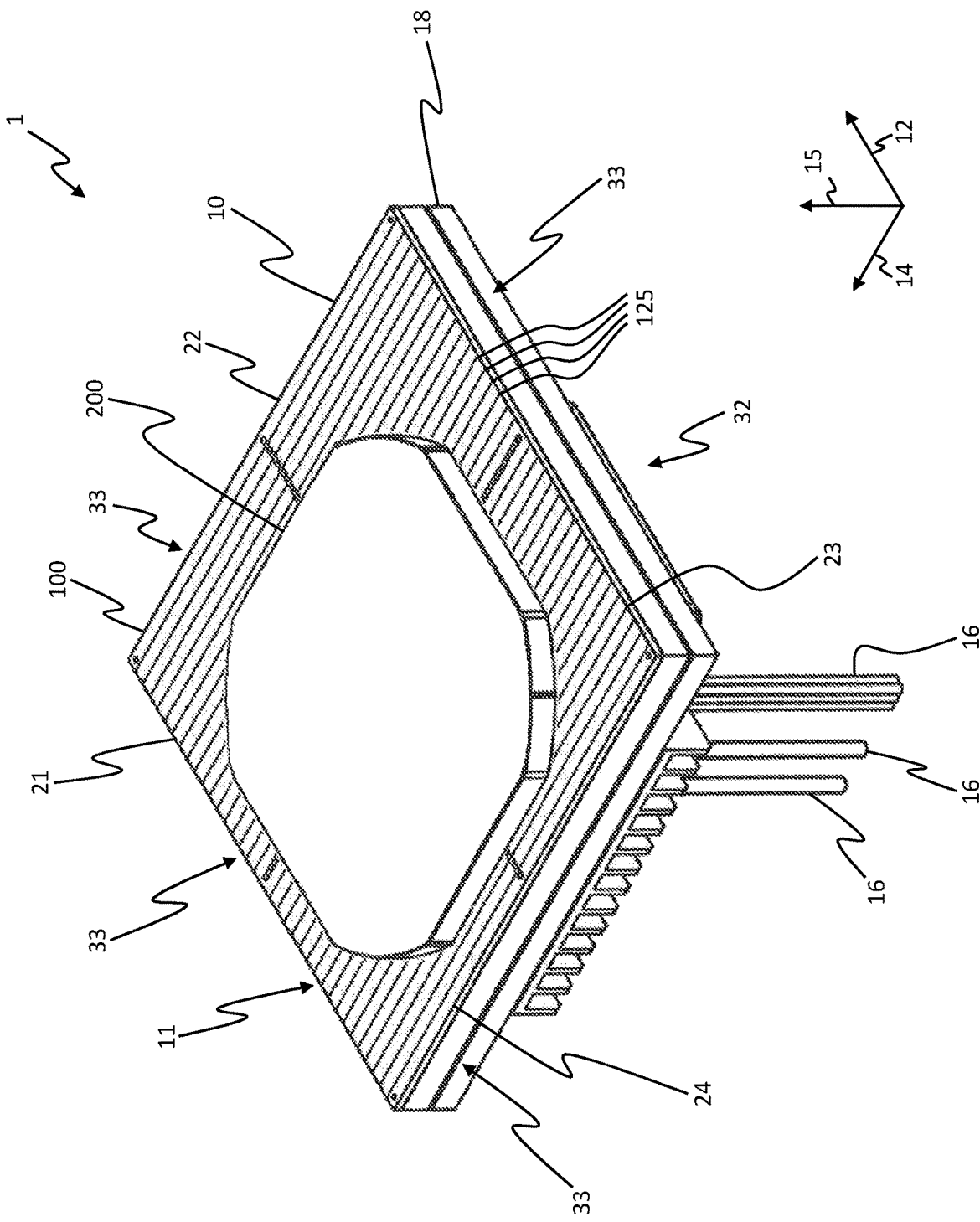
FIG. 1 shows a planar drive system with a stator module.

FIG. 1 shows a planar drive system 1 having a stator module 10 and a rotor 200. The stator module 10 comprises a module housing 18 and a stator assembly 100 which is arranged on the upper side of the module housing 18. The stator assembly 100 is embodied as a planar stator and has a flat or planar stator surface 11. The stator surface 11 extends over the entire upper side of the stator assembly 100 and of the stator module 10. On the stator surface 11, the stator assembly 100 comprises a plurality of conductor strips 125 which may be supplied with drive currents. A magnetic field may be generated by the drive currents in the conductor strips 125, which drives the rotor 200 in interaction with the drive magnets of the rotor 200.

In operation, the rotor 200 is movably arranged above the stator surface 11 of the stator module 10 and may be driven both in a first direction 12 and in a second direction 14 perpendicular to the first direction 12. By driving the rotor 200 in the first direction 12 as well as in the second direction 14, it may be driven over the stator surface 11 in any direction. In general, the rotor 200 may be driven in a first direction and in a second direction linearly independent from the first direction. For example, the rotor 200 may be kept floating above the stator surface 11 by magnetic interaction between the drive magnets and suitable drive currents in the conductor strips 125. In addition to driving the rotor 200 in the first direction 12 and in the second direction 14, the rotor 200 may also be driven in a third 15 direction perpendicular to the first direction 12 and the second direction 14. By driving the rotor 200 in the third direction 15, the distance of the rotor 200 from the stator surface 11 may be varied, i.e. the rotor 200 may be raised or lowered above the stator surface 11.

The module housing 18 comprises electronic modules for driving and for controlling of the rotor 200. The electronic modules may, for example, include power modules for generating the drive currents and control modules for controlling the power modules and drive currents. On a bottom side 32 of the module housing 18 opposite the stator surface 11, connections are arranged for connecting the stator module 10 to a plurality of connection lines 16. The connection lines 16 may, for example, comprise a control line for transmitting control signals for the control modules and a power-supply line for supplying the power and/or control modules with electrical energy. In particular, the power module may be supplied with electrical energy via the power-supply line in order to generate the drive currents.

The module housing 18, the stator assembly 100 and the stator surface 11 are rectangular, in particular square, when viewed from above on the stator surface 11. The stator module 10 and the module housing 18 have four side faces 33 between the stator surface 11 and the opposite bottom side 32. The side faces 33 are each oriented perpendicular to the stator surface 11 and are designed as flat or planar surfaces. The side faces 33 of the stator module 10 are flush with the rectangular stator surface 11 on the upper side of the stator module 10. In particular, the stator surface 11 extends in the first direction 12 and in the second direction 14 between two of the side faces 33.

In the stator module 10, the stator surface 11 adjoins the side faces 33 of the stator module 10 at a first outer edge 21, a second outer edge 22, a third outer edge 23 and a fourth outer edge 24. The outer edges 21, 22, 23, 24 limit the stator surface 11 or the stator assembly 100 on the side faces 33 of the stator module 10.

Several stator modules 10 may be arranged next to one another in such a way that the outer edges 21, 22, 23, 24 of adjacent stator modules 10 adjoin one another and the stator surfaces 11 of the stator modules 10 form a continuous working surface over which the rotor may be moved without interruption. As the side faces 33 of the stator module 10 are flush with the stator surface 11 at the outer edges 21, 22, 23, 24, the stator surfaces 11 of two adjacent stator modules 10 may be adjoined almost seamlessly by arranging the stator modules 10 with adjacent side faces 33 or adjacent outer edges 21, 22, 23, 24.

Figure 2:
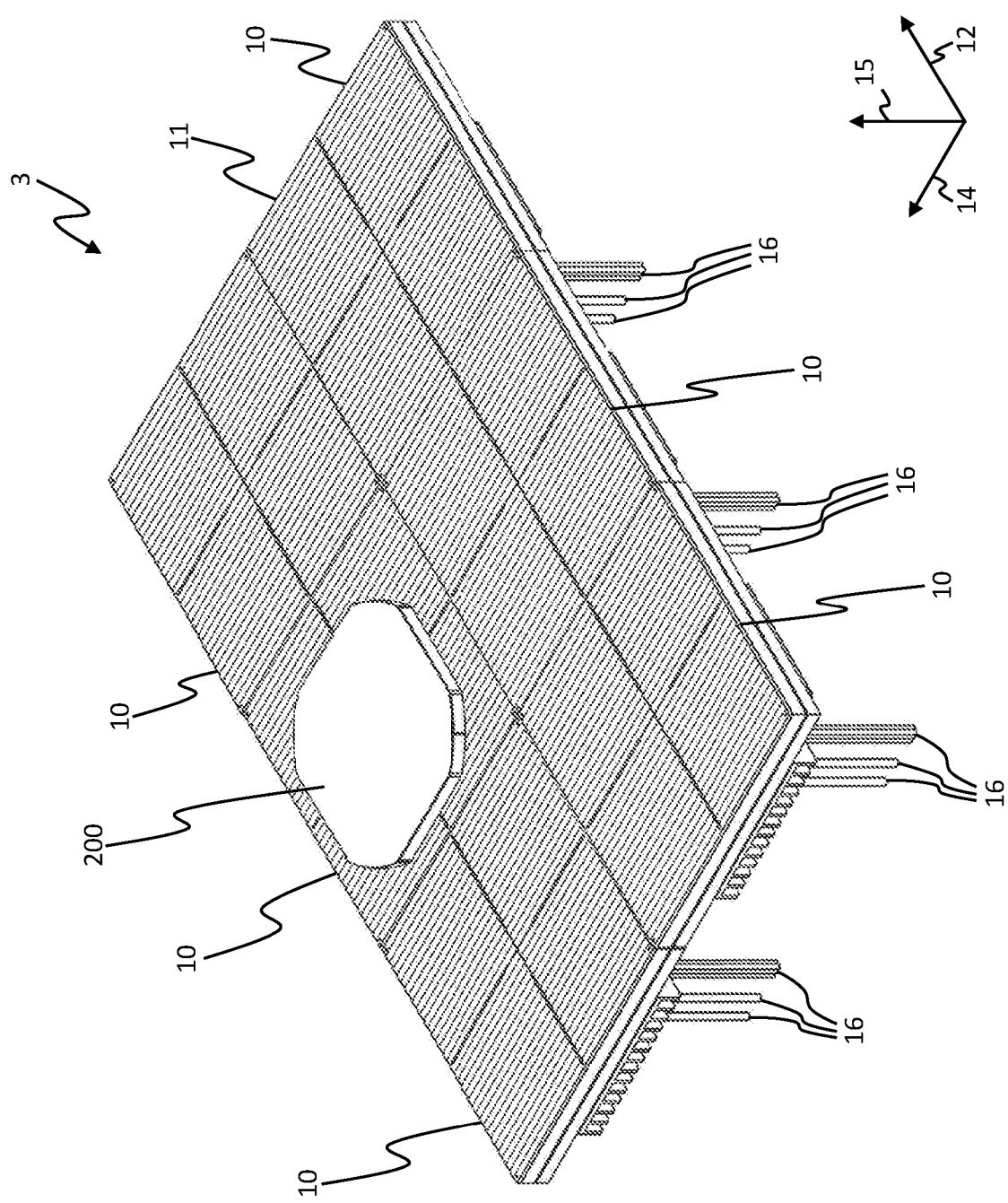
FIG. 2 depicts a view of another planar drive system with six stator modules arranged side by side.

FIG. 2 shows a view of a further planar drive system 3 having six stator modules 10 arranged side by side. The stator modules 10 are embodied in the same manner as the stator module 10 shown in FIG. 1. The stator modules 10 are arranged in two first rows arranged side by side in the first direction 12 and extending along the second direction 14 and in three second rows or, respectively, columns arranged side by side in the second direction 14 and extended along the first direction 12. Adjacent stator modules 10 are each arranged adjacent to one another in such a way that the outer edges 21, 22, 23, 24 of adjacent stator modules 10 lie adjacent to one another. As a result, the stator surfaces 11 form a continuous planar working surface for the rotor 200. The rotor 200 can be moved seamlessly from the stator surface 11 of one of the stator modules 10 to or over the stator surface 11 of the adjacent stator module 10.

In principle, the stator modules 10 may be joined in the first and second directions 12, 14 to form planar-drive systems of any size. Each of the stator modules 10 may be supplied with control signals and/or power via its associated connecting lines 16. Alternative embodiments of the stator modules 10 may also have electrical connection elements by which control signals and/or electrical energy may be transmitted from one stator module 10 to the adjacent stator module 10. Such connecting elements can, for example, be arranged on the side faces 33 of the stator modules 10. The connecting elements may be embodied as plug connectors or as contact surfaces that may be arranged adjacent to each other.

Figure 3:
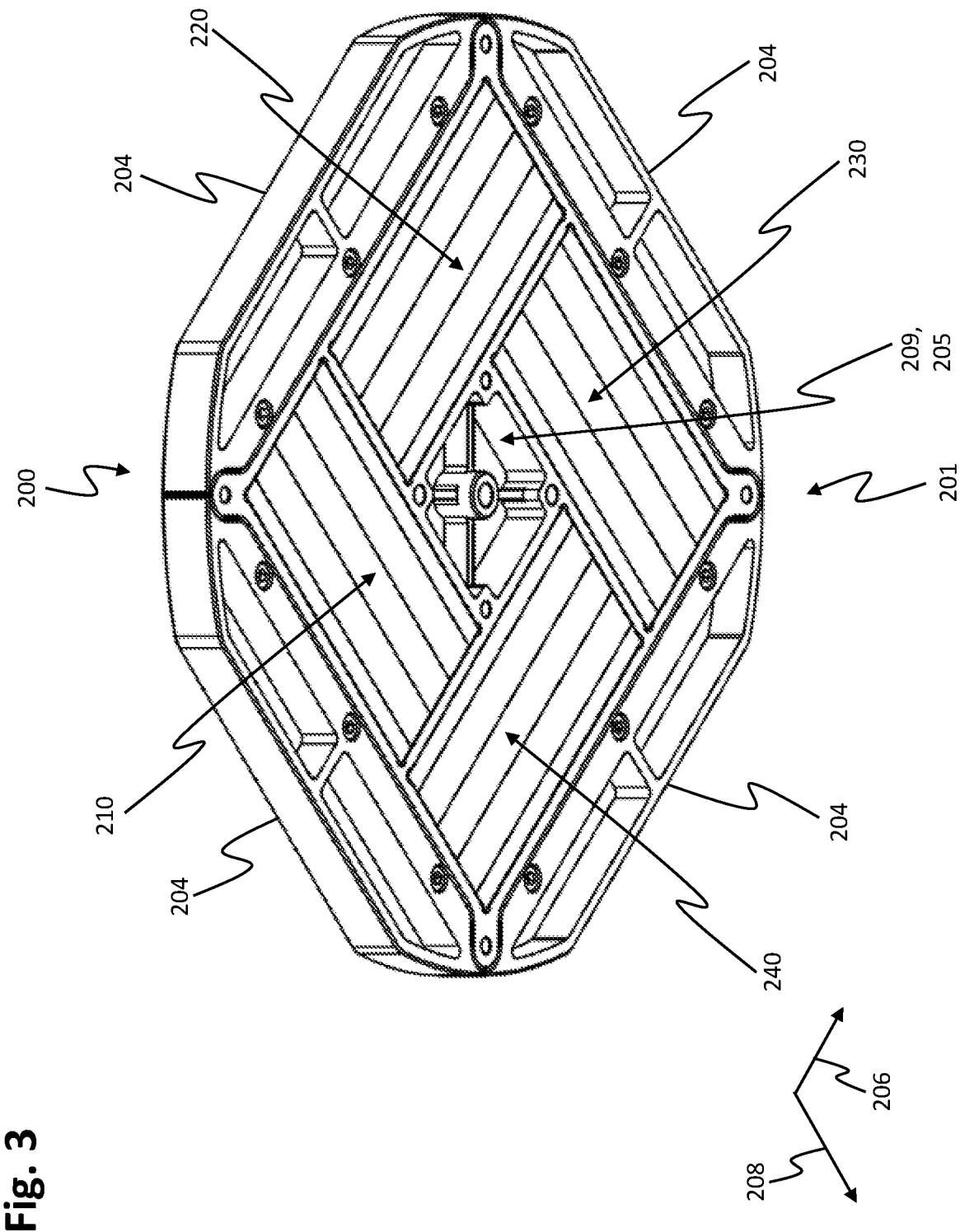
FIG. 3 depicts a rotor for the planar drive system with a magnet arrangement.

FIG. 3 shows the rotor 200 of the planar drive system 1 in a bottom view onto a bottom side of the rotor 200. In operation of the planar-drive system 1, the bottom side of the rotor 200 faces the stator surface 11 of the stator module 10. The rotor 200 has a magnet arrangement 201 on the bottom side. The magnet arrangement 201 is rectangular, particularly square, and comprises several magnets. The bottom side of the rotor 200 is flat or planar, in particular in the region of the magnets of the magnet arrangement 201. In operation, the bottom side of the rotor 200 with the magnet arrangement 201 is essentially oriented in parallel to the stator surface 11 and is arranged facing the stator surface 11.

The magnet arrangement 201 comprises a first magnet unit 210, a second magnet unit 220, a third magnet unit 230 and a fourth magnet unit 240. The first magnet unit 210 and the third magnet unit 230 each have 208 elongated drive magnets arranged side by side in a first rotor direction 206 and extending along a second rotor direction oriented perpendicularly to the first rotor direction 206. The second magnet unit 220 and the fourth magnet unit 240 each have 208 elongated drive magnets arranged next to one another in the second rotor direction 208 and extending along the first rotor direction 206. The first and third magnet units 210, 230 are used to drive the rotor 200 in the first rotor direction 206 and the second and fourth magnet units 220, 240 are used to drive the rotor 200 in the second rotor direction 208.

The rotor 200 has four spacers 204, which are arranged on four outer sides of the magnet arrangement 201. The spacers 204 are arranged and embodied on the rotor 200 in such a way that even when the spacers 204 of two adjacent rotors 200 touch each other, a minimum distance between the magnet arrangements 210 of the two adjacent rotors 200 is maintained. The minimum distance may be dimensioned in such a way that attraction forces between the magnet arrangements of adjacent rotors 200 do not exceed a maximum force. The maximum force may be such that it is impossible for the bottom sides of adjacent rotors 200 to be erected from the position parallel to the stator surface 11 due to the attractive force between the magnets of their magnet arrangements 201 and for the two rotors to remain magnetically stuck to each other with their bottom sides facing each other. The spacers 204 may be embodied to absorb energy when two rotors 200 touch. The spacers 204 may comprise an elastically deformable material or consist of such a material.

In the center of the magnet arrangement 201, the rotor 200 comprises a free space 209 that is not covered by magnets of the magnet arrangement 201. In the area of the free space 209, the rotor 200 has a fastening structure 205. A payload arranged on the rotor 200 or a structure arranged on the rotor 200 may be attached to the fastening structure 205. The fastening structure 205 may be embodied as bore holes, particularly threaded holes, accessible from the top of the rotor 200.

Figure 4:
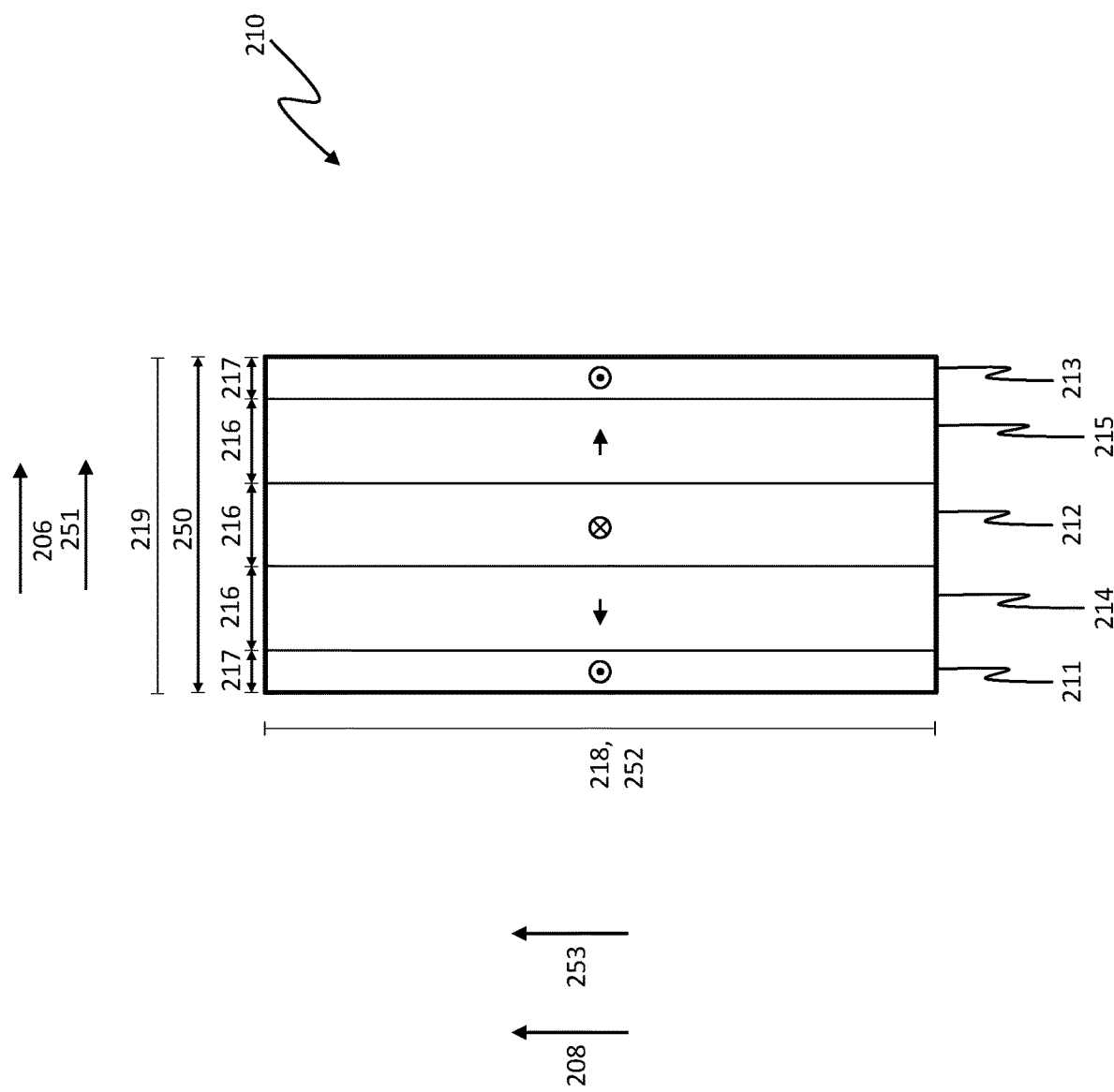
FIG. 4 shows a top view of a magnet unit of the magnet arrangement of the rotor.

FIG. 4 shows a top view of the first magnet unit 210 of the magnet arrangement 201 of the rotor 200. In the top view shown in FIG. 4, the stator surface 11 of the stator module 10 is, with regard to the drawing sheet plane, located behind or below the first magnet unit 210 during operation of the planar-drive system 1. Unless differences are described, the second, third and fourth magnet units 220, 230, 240 shown in FIG. 3 are identical to the first magnet unit 210.

The first magnet unit 210 has a rectangular embodiment. It has a width 250 in a width direction 251 which is smaller than a length 252 of the first magnet unit 210 in a length direction 253 oriented perpendicularly with regard to the width direction 251. In the first magnet unit 210 the width direction 251 corresponds to the first rotor direction 206 and the length direction 253 to the second rotor direction 208. Similarly, a width direction of the third magnet unit 230 is parallel to the first rotor direction 206 and a length direction of the third magnet unit 230 is parallel to the second rotor direction 208. A width direction of the second magnet unit 220 and a width direction of the fourth magnet unit 240 are parallel to the second rotor direction 208. A length direction of the second magnet unit 220 and a length direction of the fourth magnet unit 240 extend in parallel to the first rotor direction 206.

The first magnet unit 210 comprises a first drive magnet 211, a first compensating magnet 214, a second drive magnet 212, a second compensating magnet 215 and a third drive magnet 213, in the following generally referred to as magnets 211, 212, 213, 214, 215. The magnets 211, 212, 213, 214, 215 have an elongated embodiment and extend along a width direction 251 of the first magnet unit 210, i.e. in a top view they have a rectangular cross-sectional area the width in the width direction 251 of which is smaller than their length in the length direction 253.

In the width direction 251, the first drive magnet 211 is arranged at a boundary of the first magnet unit 210 and the third drive magnet 213 is arranged at an opposite boundary of the first magnet unit 210. The first compensating magnet 214 is arranged beside the first drive magnet 211, the second drive magnet 212 beside the first compensating magnet 214, the second compensating magnet 215 beside the second drive magnet 212 and the third drive magnet 213 beside the second compensating magnet 215. The magnets 211, 212, 213, 214, 215 are respectively arranged adjacent to one another, in particular adjacent to one another without gaps in between.

The magnets inside of the first magnet arrangement 210, i.e. the first compensation magnet 214, the second drive magnet 212 and the second compensation magnet 215 have a width in the first rotor direction 206 and in the width direction 251 which corresponds to a first magnet width 216. The magnets located at the edge, i.e. the first and the third drive magnet 211, 213, have a width in the first rotor direction 206 and in the width direction 251 which corresponds to a second magnet width 217. The second magnet width 217 corresponds to half of the first magnet width 216. The magnets 211, 212, 213, 214, 215 have a magnet length 218 in the second rotor direction 208 and in the length direction 253 which corresponds to eight times the first magnet width 216. The first magnet unit 210 thus has a width 250 along the width direction 251 which corresponds to four times the first magnet width 216. Along the length direction 253, the first magnet unit 210 has a length 252 which is twice its width 250 and eight times the first magnet width 216.

The first drive magnet 211 and the third drive magnet 213 each have a magnetization which is oriented towards an upper side of the rotor 200 opposite to the bottom side of the rotor 200. The second drive magnet 212 has a magnetization which is oriented from the top side of the rotor 200 towards the bottom side of the rotor 200. The first compensating magnet 214 has a magnetization oriented from the first drive magnet 211 towards the second drive magnet 212, and the second compensating magnet 215 has a magnetization oriented from the third drive magnet 213 towards the second drive magnet 212. The magnets 211, 212, 213, 214, 215 of the first magnet unit 210 are arranged in a Halbach array configuration in which the field of the drive magnets 211, 212, 213 is amplified by the field of the compensation magnets 214, 215 on the side of the magnet arrangement 201 facing the bottom side of the rotor 200 and is weakened or, respectively, compensated on the side of the magnet arrangement 201 facing the top side of the rotor 200.

The first magnet unit 210 generates a magnetic field which is essentially homogeneous in the region below the first magnet unit 210 along the length direction 253 and has an essentially harmonic, i.e. sinusoidal or cosinusoidal, progression along the width direction 251. The periodicity of the harmonic field progression essentially corresponds to the width 250 of the first magnet unit 210.

Apart from boundary effects caused by the finite extension of the first magnet unit 210 in the width direction 251, the field characteristic of the magnetic field generated by the magnets 211, 212, 213, 214, 215 corresponds to the field characteristic which would be generated by repeatedly and periodically stringing the magnets 211, 212, 213, 214, 215 of the first magnet unit 210 together along the width direction 251. In such a sequence, the magnetization directions of the individual magnets are repeated after a magnetizing period 219 corresponding to the width 250 of the first magnet unit 210 or to four times the first magnet width 216. In this respect, the magnetizing period 219 of the first magnet unit 210 corresponds to four times the first magnet width 216 and to the width 250 of the first magnet unit 210. The length 252 of the first magnet unit 210 and the magnet length 218 corresponds to twice the magnetizing period 219.

Figure 5:
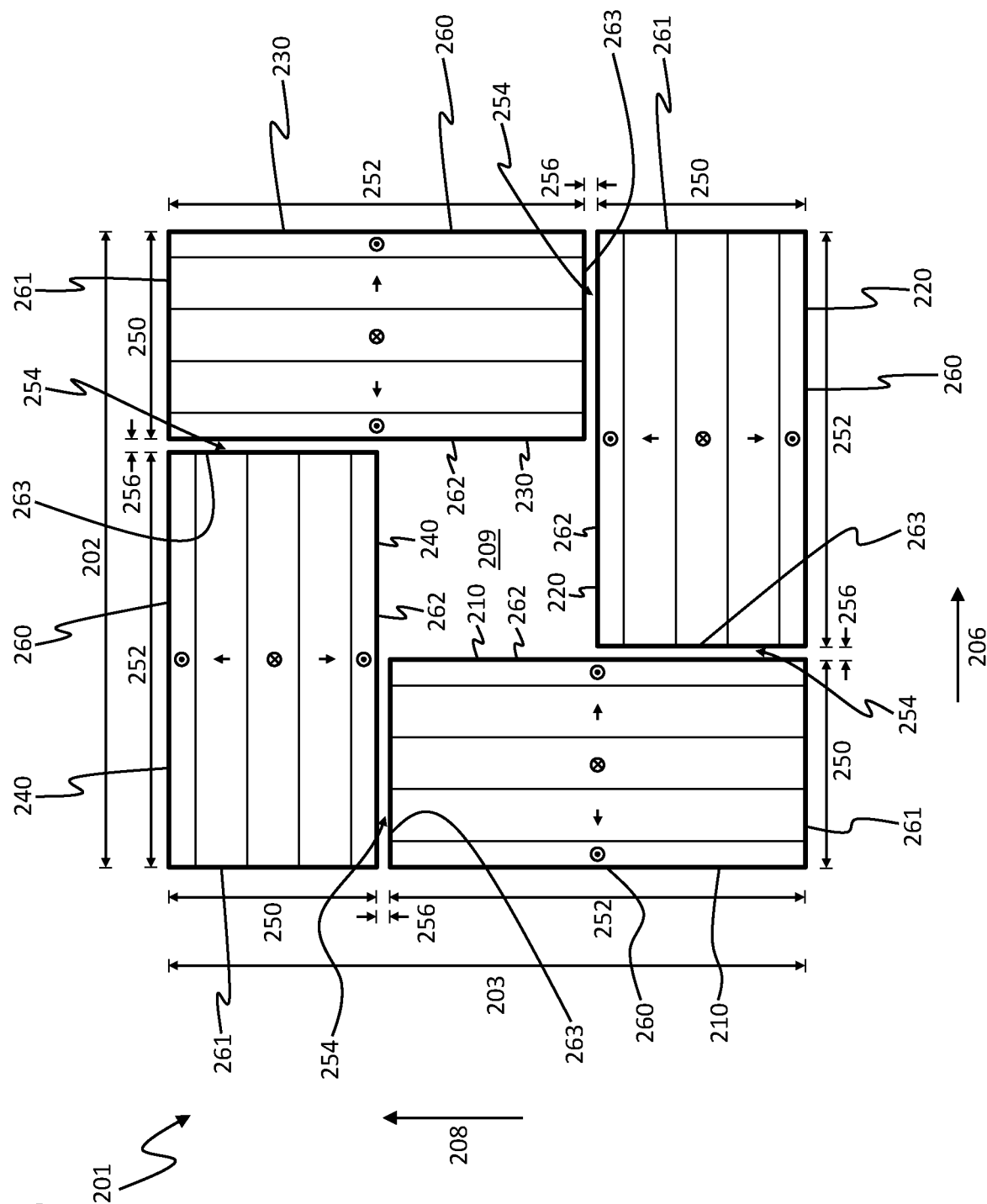
FIG. 5 shows a top view of the magnet arrangement of the rotor.

FIG. 5 shows a top view of the magnet arrangement 201 of the rotor 200 comprising the four magnet units 210, 220, 230, 240. As in the top view shown in FIG. 4, in the top view shown in FIG. 5 the stator surface 11 of the stator module 10 is located behind or below the magnet units 210, 220, 230, 240 during operation of the planar-drive system 1.

The magnet arrangement 201 is rectangular, in particular square. An extension of the magnet arrangement 201 in the first rotor direction 206 corresponds to an extension of the magnet arrangement 201 in the second rotor direction 208.

In the magnet arrangement 201, the first and third magnet units 210, 230 are arranged with their width direction 251 (according to FIG. 4) along the first rotor direction 206 and with their length direction 253 along the second rotor direction 208. The second and the fourth magnet unit 220, 240 are arranged with their width direction 251 along the second rotor direction 208 and with their length direction 253 along the first rotor direction 206. The first and third magnet units 210, 230 are thus arranged at a rotation of 90° with regard to the second and fourth magnet units 220, 240. The magnet units 210, 220, 230, 240 are arranged around the free space 209 in the middle of the magnet arrangement 201.

In the magnet arrangement 201, the elongated magnets 211, 212, 213, 214, 215, in particular the drive magnets 211, 212, 213, of the first magnet unit 210 and of the third magnet unit 230 are arranged side by side in the first rotor direction 206 and extended along the second rotor direction 208, which is oriented perpendicularly with regard to the first rotor direction 206. The elongated magnets, in particular the drive magnets, of the second magnet unit 220 and the fourth magnet unit 240 are arranged next to one another in the second rotor direction 208 and extended along the first rotor direction 206.

The width 250 or, respectively, the extension of the first magnet unit 210 and the third magnet unit 230 in the first rotor direction 206 corresponds to the magnetizing period 219 of the first and third magnet units 210, 230. The width 250 or, respectively, the extension of the second magnet unit 220 and the fourth magnet unit 240 in the second rotor direction 208 corresponds to the magnetizing period 219 of the second and fourth magnet unit 220, 240. The length 252 or, respectively, the extension of the first magnet unit 210 and of the third magnet unit 230 in the second direction 208 corresponds to twice the magnetizing period 219 of the second and of the fourth magnet units 220, 240. The length 252 and extension of the second magnet unit 220 and of the fourth magnet unit 240 in the first direction 208 corresponds to twice the magnetizing period 219 of the first and third magnet units 220, 240.

At the outer edge of the magnet arrangement 201 an outer longitudinal edge 260 of the first magnet unit 210 extending in the second rotor direction 208 is flush with an outer transverse edge 261 of the fourth magnet unit 240 extending in the second rotor direction 208. An outer longitudinal edge 260 of the second magnet unit 220 extending in the first rotor direction 206 is flush with an outer transverse edge 261 of the first magnet unit 210 extending in the first rotor direction 206. An outer longitudinal edge 260 of the third magnet unit 230 extending in the second rotor direction 208 is flush with an outer transverse edge 261 of the fourth magnet unit 240 extending in the second rotor direction 208. An outer longitudinal edge 260 of the fourth magnet unit 240 extending in the first rotor direction 206 is arranged in alignment with an outer transverse edge 261 of the third magnet unit 230 extending in the first rotor direction 206.

The first and the second magnet unit 210, 220, the second and the third magnet unit 220, 230, the third and the fourth magnet unit 230, 240, as well as the fourth and the first magnet unit 240, 210 are each arranged next to each other distanced by a gap 254. The gap 254 is respectively located between an inner transverse edge 263 of the first magnet unit 210 extending in the first rotor direction 206 and an inner longitudinal edge 262 of the fourth magnet unit 240 extending in the first rotor direction 206, between an inner transverse edge 263 of the fourth magnet unit 240 extending in the second rotor direction 208 and an inner longitudinal edge 262 of the third magnet unit 230 extending in the second rotor direction 208, between an inner transverse edge 263 of the third magnet unit 230 extending in the first rotor direction 206 and an inner longitudinal edge 262 of the second magnet unit 220 or between an inner transverse edge 263 of the second magnet unit 220 extending in the second rotor direction 208 and an inner longitudinal edge 262 of the first magnet unit 210 extending in the second rotor direction 208.

An extension 202 of the magnet arrangement 201 in the first rotor direction 206, i.e. the width of the magnet arrangement 201, and an extension 203 of the magnet arrangement 201 in the second rotor direction 208, i.e. the length of the magnet arrangement 201, correspond to the sum of the width 250 of the magnet units 210, 220, 230, 240, of the length 252 of the magnet units 210, 220, 230, 240 and of the width 256 of the gaps 254. The gap 254 may have a width 256 in the direction of the outer longitudinal edges 260 and the outer transverse edges 261 of adjacent magnet units 210, 220, 230, 240, each corresponding to one twelfth of the magnetizing period 219 of the magnet units 210, 220, 230, 240.

The magnetizing period 219 may, for example, be 40 mm. The width 250 of the magnet arrangements 210, 220, 230, 240 may also have a width of 40 mm and a length of 80 mm. The first magnet width 216 may be 10 mm. The extension 202 of the magnet arrangement 201 in the first rotor direction 206 and the extension 203 of the magnet arrangement 201 in the second rotor direction 208 may each be 123.33 mm.

Figure 6:
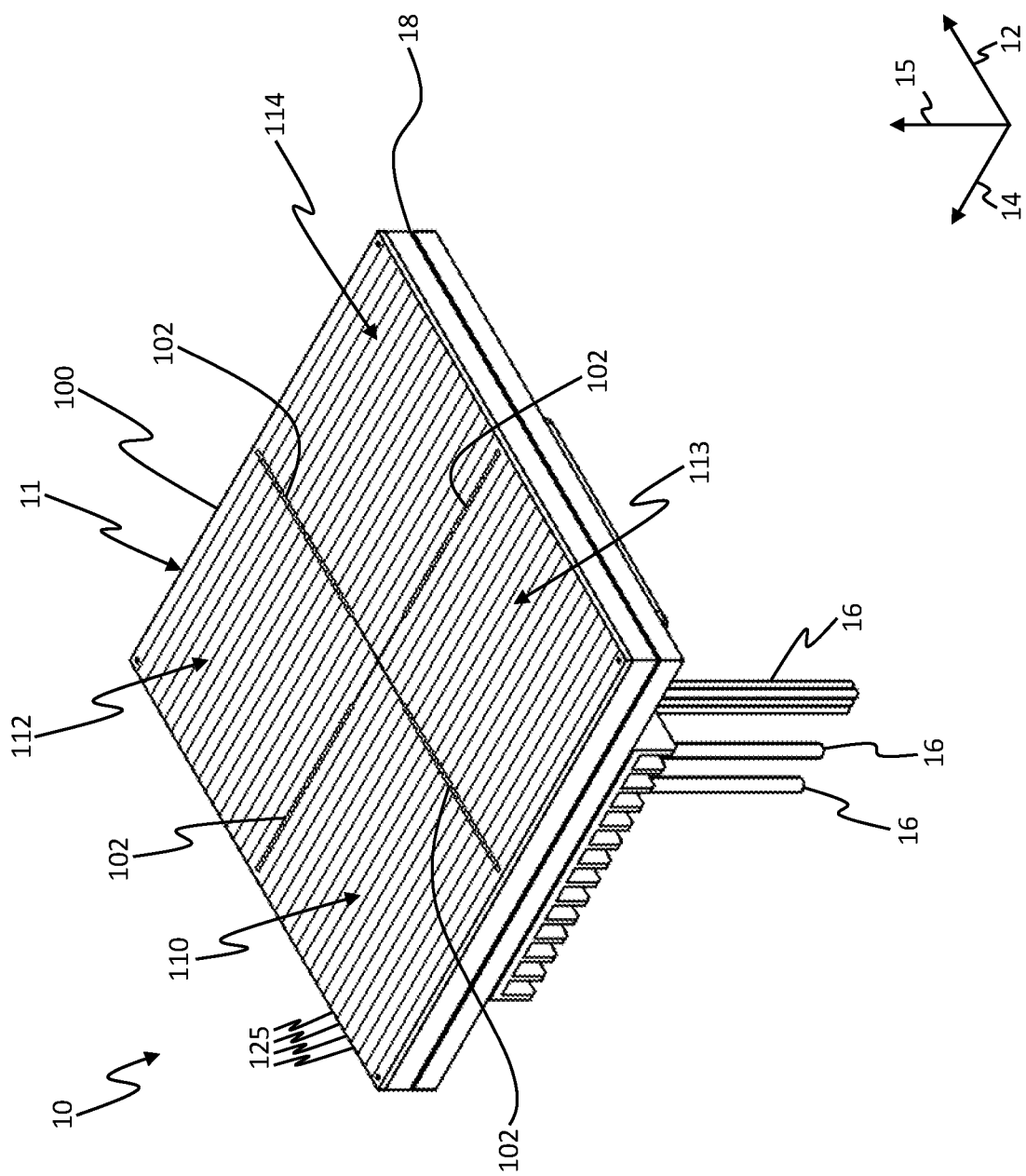
FIG. 6 depicts the stator module of the planar drive system.

FIG. 6 shows the stator module 10 of the planar drive system 1 in an isometric view without the rotor 200. The stator assembly 100 comprises a first stator sector 110, a second stator sector 112, a third stator sector 113 and a fourth stator sector 114. The stator sectors 110, 112, 113, 114 each comprise a part of the conductor strips 125 which are each electrically insulated from one another. Each of the conductor strips 125 is completely arranged in one of the stator sectors 110, 112, 113, 114. The stator sectors 110, 112, 113, 114 are rectangular. In particular, the stator sectors 110, 112, 113, 114 may be square so that an extension of the stator sectors 110, 112, 113, 114 in the first direction 12 corresponds to an extension of the stator sectors 110, 112, 113, 114 in the second direction 14.

The stator sectors 110, 112, 113, 114 are arranged in two adjacent rows in the first direction 12 and in the second direction 14 in two adjacent rows adjacent to one another, as well. The stator sectors 110, 112, 113, 114 of adjacent rows are also arranged adjacent to each other. In the first direction 12, the stator assembly 100 comprises a row with the first stator sector 110 and the second stator sector 112 and a further row with the third stator sector 113 and the fourth stator sector 114. In the second direction 14, the stator assembly 100 comprises a row with the first stator sector 110 and the third stator sector 113 and a further row with the second stator sector 112 and the fourth stator sector 114.

The stator sectors 110, 112, 113, 114 each have an extension in the first direction 12 and in the second direction 14 which is half the extension of the stator assembly 100 or, respectively, of the stator module 10 in the corresponding direction. The boundaries of the stator sectors 110, 112, 113, 114 thus extended in the first and in the second direction 12, 14 in each case in the center of the stator assembly 100 and intersect in the center of the stator assembly 100. The stator sectors 110, 112, 113, 114 each comprise a quarter of the area, i.e. one quadrant, of the stator assembly 100.

Figure 7:
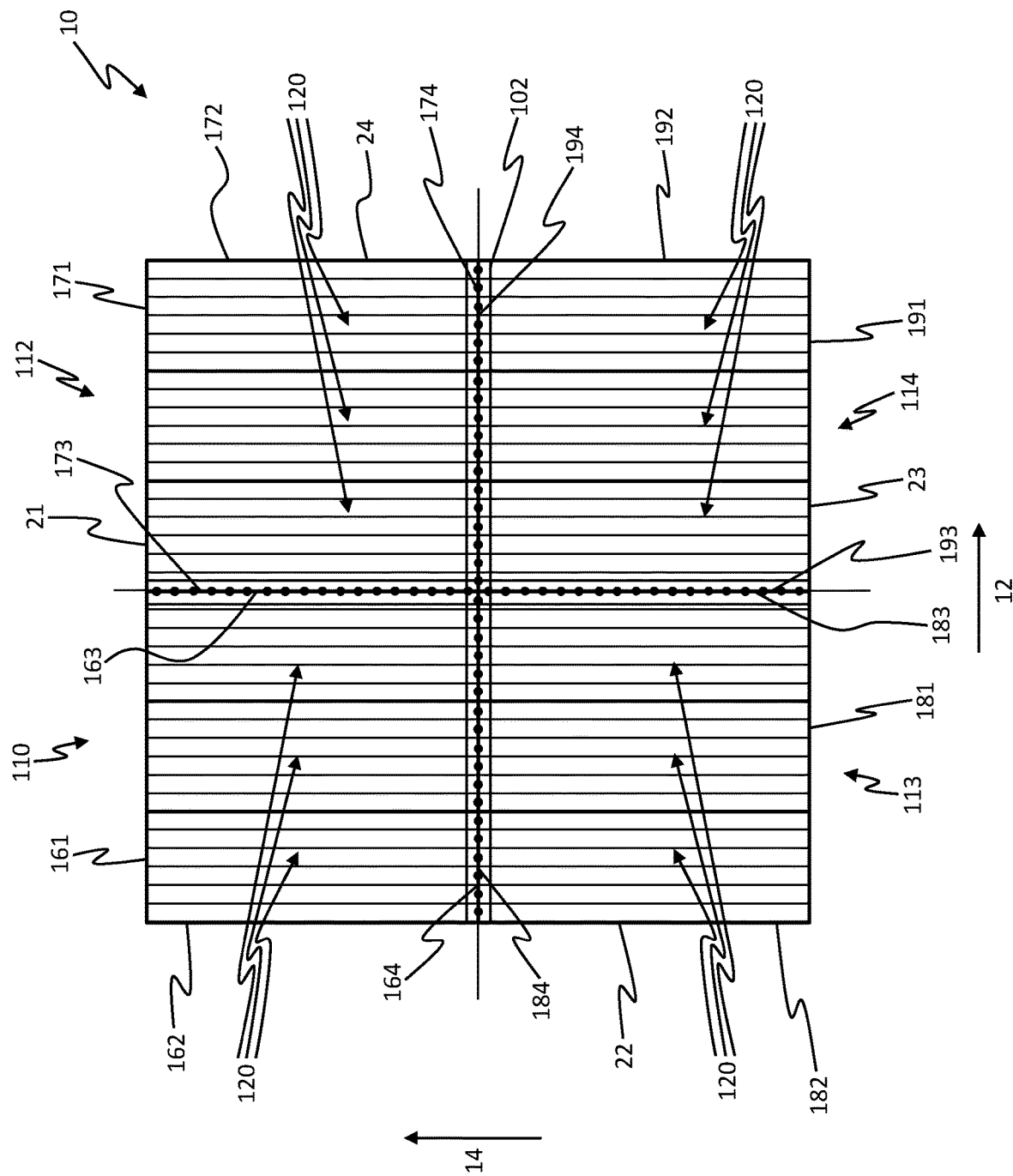
FIG. 7 is a top view of the stator module with a stator assembly having a first, second, third and fourth stator sector.

FIG. 7 shows a top view of the stator module 10 with the stator assembly 100 and the stator sectors 110, 112, 113, 114. The stator sectors 110, 112, 113, 114 are flush with the stator module 10 on the outer sides. In particular, a first outer edge 161 of the first stator sector 110 and a first outer edge 171 of the second stator sector 112 are flush with a first outer edge 21 of the stator module 10. A second outer edge 162 of the first stator sector 110 and a second outer edge 182 of the third stator sector 113 are flush with a second outer edge 22 of the stator module 10. A first outer edge 181 of the third stator sector 113 and a first outer edge 191 of the fourth stator sector 114 are flush with a third outer edge 23 of the stator module 10. A second outer edge 172 of the second stator sector 112 and a second outer edge 192 of the fourth stator sector 114 are flush with a fourth outer edge 24 of the stator module 10.

Inside of the stator assembly 100 the stator sectors 110, 112, 113, 114 are arranged adjacent to each other. A first inner edge 163 of the first stator sector 110 is arranged at a first inner edge 173 of the second stator sector 112. A second inner edge 174 of the second stator sector 112 is arranged at a second inner edge 194 of the fourth stator sector 114. A first inner edge 183 of the third stator sector 113 is arranged at a first inner edge 193 of the fourth stator sector 114. A second inner edge 184 of the third stator sector 113 is arranged at a second inner edge 164 of the first stator sector 110.

In the stator module 10, the first inner edges 163, 173, 183, 193 of the stator sectors 110, 112, 113, 114 are each located on a first line and the second inner edges 164, 174, 184, 194 of the stator sectors 110, 112, 113, 114 are located on a second line. The first line is perpendicular to the second line. The first line is arranged in the middle of the stator module 10 and of the stator assembly 100. In particular, the first line is arranged centrally between the second and fourth outer edges 22, 24 of the stator module 10 and of the stator assembly 100. The second line is also arranged in the middle of the stator module 10 of and the stator assembly 100. In particular, the second line is arranged centrally between the first and third outer edges 21, 23 of stator module 10 and stator assembly 100. The first line forms a first center line of the stator assembly 100 oriented along the second direction 14 and the second line forms a second center line of the stator assembly 100 oriented along the first direction 12.

Within the stator sectors 110, 112, 113, 114, the conductor strips 125 are arranged in several stator layers or stator planes arranged on top of one another, each of the stator layers comprising only conductor strips 125 which either extend along the first direction 12 or along the second direction 14. With respect to the orientation and arrangement of the conductor strips 125 and with respect to the stator layers, the stator sectors 110, 112, 113, 114 are of essentially identical construction.

Figure 8:
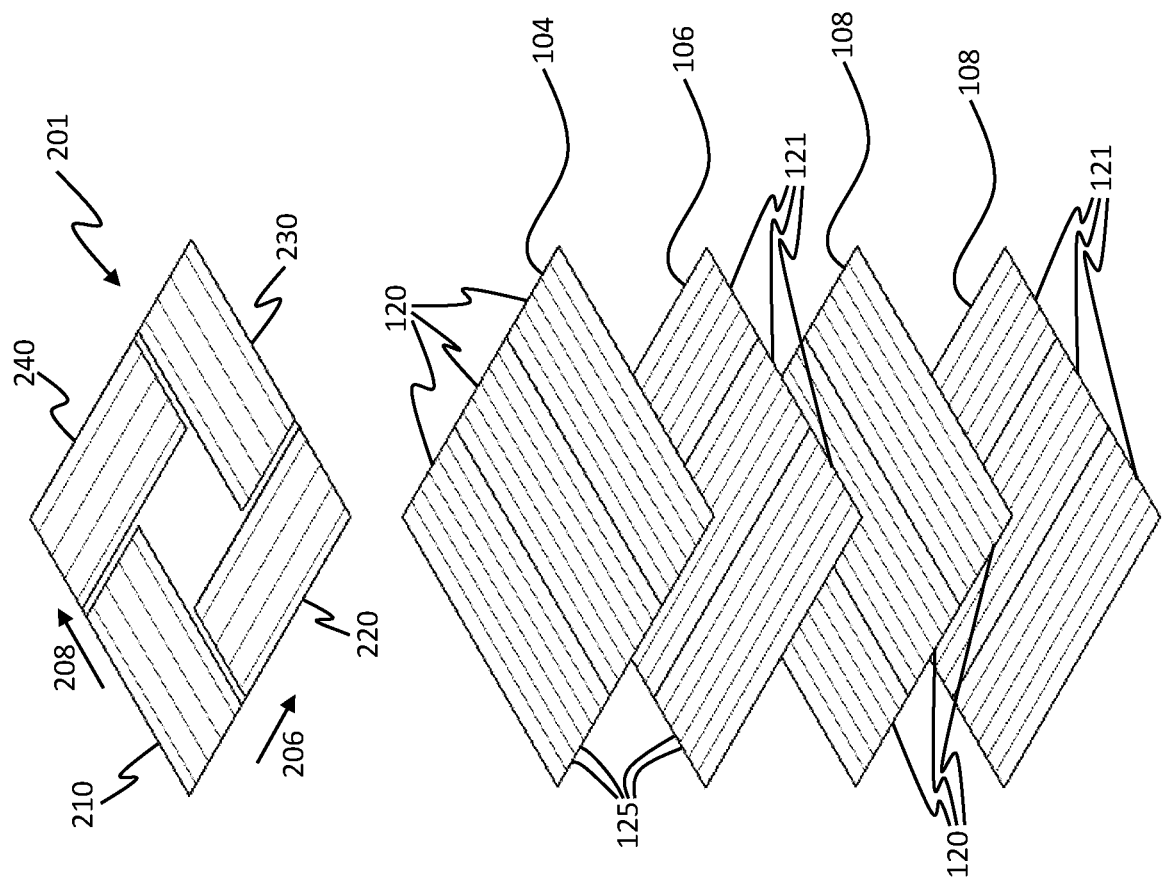
FIG. 8 is an exploded view of the first, second, third and fourth stator sectors and the magnet arrangement.

FIG. 8 shows an exploded view of the first stator sector 110 with four stator layers arranged on top of one another. Unless differences are described, the second, third and fourth stator sectors 112, 113, 114 are constructed identically to the first stator sector 110. The first stator sector 110 has a first stator layer 104, a second stator layer 106 arranged below the first stator layer 104 and two further stator layers 108 arranged below the second stator layer 106. The first stator layer 104 comprises only conductor strips 125 which are arranged next to each other along the first direction 12 and have an elongated embodiment along the second direction 14. The second stator layer 106 comprises only conductor strips 125 which are arranged next to one another along the second direction 14 and have an elongated embodiment along the first direction 12.

In total, the first stator sector 110 alternately comprises stator layers 104, 108, which have elongated conductor strips 125 only extending along the second direction 14, and stator layers 106, 108, which have elongated conductor strips 125 only extending along the first direction 12. In particular, a first one of the further stator layers 108 arranged below the second stator layer 106 only comprises conductor strips 125 which are extended along the second direction 14, and a second one of the further stator layers 108 arranged below the first one of the further stator layers 108 comprises only conductor strips 125 which are extended along the first direction 12.

In alternative embodiments of the stator module 10, the first stator sector 110 may comprise further stator layers 104, 106, 108 among the stator layers 104, 106, 108 shown in FIG. 8. The first stator sector 110 may alternately comprise stator layers with conductor strips 125, which exclusively extend in the first direction 12, and stator layers with conductor strips 125, which are exclusively oriented in the second direction 14.

The conductor strips 125 of the first stator sector 110 are each combined to form stator segments 120, 121 within the stator layers 104, 106, 108. The first stator sector 110 respectively comprises three stator segments 120, 121 arranged side by side and adjoining one another in each stator layer 104, 106, 108. Each of the stator segments 120, 121 respectively comprises six conductor strips 125 arranged side by side. The first stator sector 110 comprises three first stator segments 120 in the first stator layer 104 and three second stator segments 121 in the second stator layer 106. The first stator segments 120 each comprise six adjacent elongated conductor strips 125 arranged adjacent to each other along the first direction 12 and extending along the second direction 14. The second stator segments 121 each comprise six adjacent elongated conductor strips 125 arranged adjacent to each other along the second direction 14 and extending along the first direction 12. In the further stator layers 108, the first stator sector 110 alternately comprises three first stator segments 120 or three second stator segments 121.

The first stator sector 110 of the stator assembly 100 thus in the first stator layer 104 and in the first of the further stator layers 108 exclusively comprises conductor strips 125 which extend along the second direction 14, and in the second stator layer 106 and in the second of the further stator layers 108 exclusively comprises conductor strips 125 which extend along the first direction 12.

The first and second stator segments 120, 121 have identical dimensions, apart from their orientation. In particular, the dimensions of the first stator segments 120 in the first direction 12 correspond to the dimensions of the second stator segments 121 in the second direction 14 and the dimensions of the first stator segments 120 in the second direction 14 correspond to the dimensions of the second stator segments 121 in the first direction 12.

The stator segments 120, 121 are arranged on top of one another in such a way that each of the first stator segments 120 of the first of and the first further stator layers 104, 108 of the first stator sector 110 respectively extends in the second direction 14 over the three second stator segments 121 of the second and of the second further stator layers 106, 108 of the first stator sector 110, arranged next to one another. In addition, the second stator segments 121 of the second and second further stator layers 106, 108 of the first stator sector 110 extend in the first direction 12 over all the first stator segments 120 of the first and first further stator layers 104, 108 of the first stator sector 110 arranged next to one another.

During operation of the planar-drive system 1, the rotor 200 may be aligned above the stator assembly 100 in such a way that the first rotor direction 206 is oriented along the first direction 12 and the second rotor direction 208 is oriented along the second direction 14. The first magnet unit 210 and the third magnet unit 230 may in operation interact with the magnetic field generated by the conductor strips 125 of the first stator segments 120 to produce a drive of the rotor 200 along the first direction 12. The second magnet unit 220 and the fourth magnet unit 240 may in operation interact with the magnetic field generated by the conductor strips 125 of the second stator segments 121 to produce a drive of the rotor 200 along the second direction 14.

Alternatively, contrary to FIG. 8, the rotor 200 may also be oriented in such a way that the first rotor direction 206 is oriented along the second direction 14 and the second rotor direction 208 is oriented along the first direction 12. In this case, the first and the third magnet units 210, 230 interact with the magnetic field of the second stator segments 121 in order to drive the rotor 200 in the second direction 14 and the second and the fourth magnet units 220, 240 interact with the magnetic field of the first stator segments 120 in order to drive the rotor 200 in the first direction 12.

Figure 9:
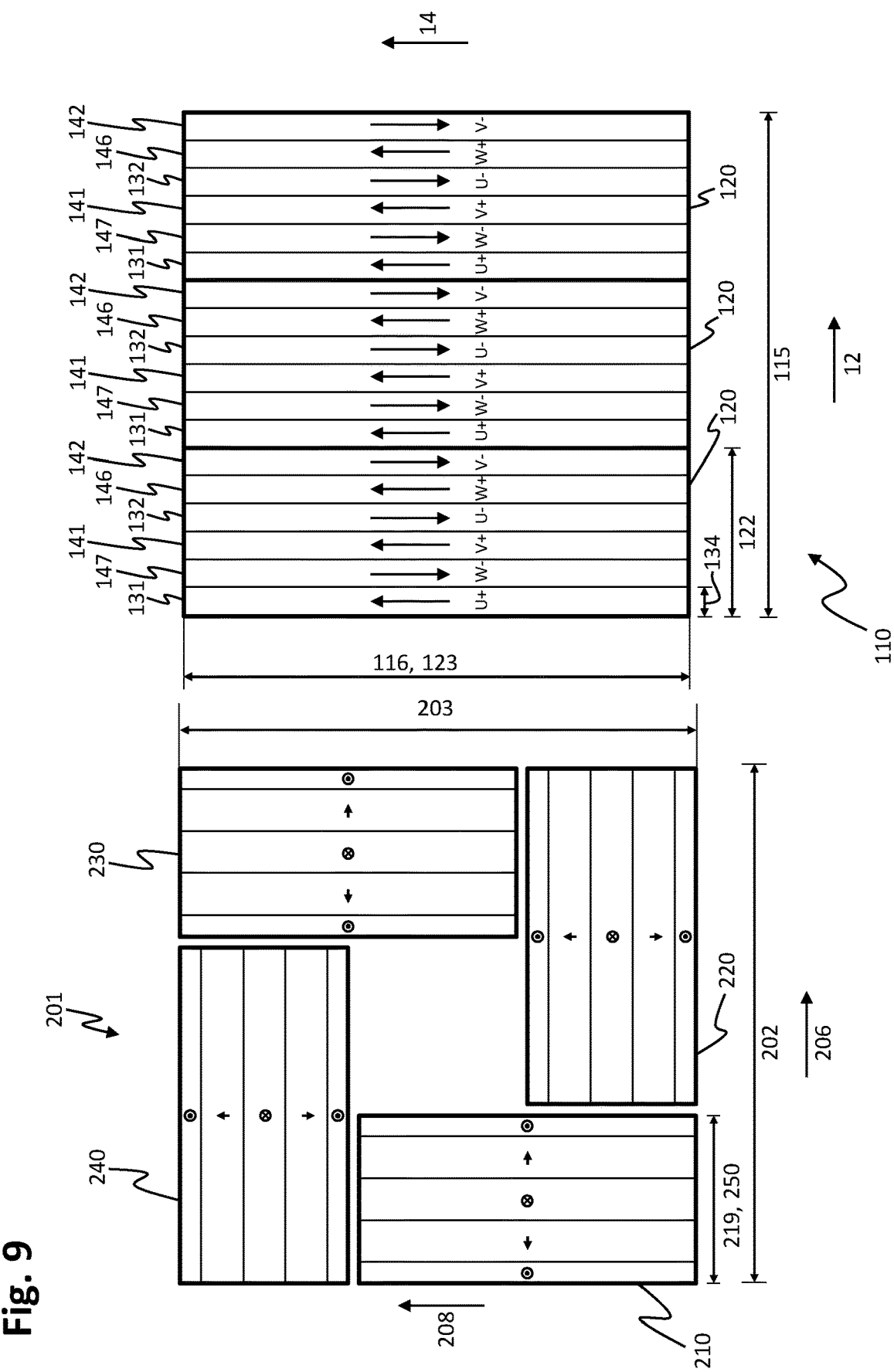
FIG. 9 shows top views of the magnet arrangement and first stator segments of the stator sectors.

FIG. 9 shows top views of the magnet arrangement 201 and of the first stator segments 120 of the first stator sector 110. Unless differences are described, the second, third and fourth stator sectors 112, 113, 114 are constructed identically to the first stator sector 110.

The first stator segments 120 have a segment width 122 in the first direction 12, which corresponds to the magnetizing period 219 and the width 250 of the first and third magnet units 210, 230 of the magnet arrangement 201 of the rotor 200. The first stator segments 120 have a segment length 123 in the second direction 14, which corresponds to three times the magnetizing period 219 and three times the width 250 of the first and third magnet unit 210, 230. A conductor period 134 of the conductor strips 125 of the first stator segments 120 of the first stator sector 110 corresponds to one sixth of the magnetizing period 219 of the first and third magnet units 210, 230. The conductor period 134 of the conductor strips 125 comprises a width of the conductor strips 125 themselves, i.e. the width of the metallization surfaces of the conductor strips 125, and a width of a gap provided between adjacent conductor strips 125 for electrical insulation. Thus, the conductor period 134 of the conductor strips 125 of the first stator segments 120 designates the distance between the center lines of adjacent conductor strips 125 oriented along the second direction 14.

Since the first stator sector 110 in the stator layers 104, 108 comprising the first stator segments 120 consists of three first stator segments 120 arranged side by side in the first direction 12, the first stator sector 110 has a sector width 115 in the first direction 12 which corresponds to three times the magnetizing period 219 of the first and third magnet unit 210, 230. The first stator sector 110 has a sector length 116 in the second direction 14 which corresponds to the sector width 115 or three times the magnetizing period 219 of the first and third magnet units 210, 230.

The sector width 115 of the first stator sector 110 is in the first direction 12 thus smaller than the width 202 of the magnet arrangement 201 in the first rotor direction 206 and smaller than the length 203 of the magnet arrangement 201 in the second rotor direction 208. The sector length 116 in the second direction 14 is thus smaller than the length 203 of the magnet arrangement 201 in the second rotor direction 208 and smaller than the width 202 of the magnet arrangement 201 in the first rotor direction 206. The width 202 and the length 203 of the magnet arrangement 201 are each larger than the sector width 115 and the sector length 116 by the width 256 of the gap 254. For example, the width 202 and the length 203 of the magnet arrangement 201 are each larger than the sector width 115 and the sector length 116 by one twelfth of the magnetizing period 219.

Figure 10:
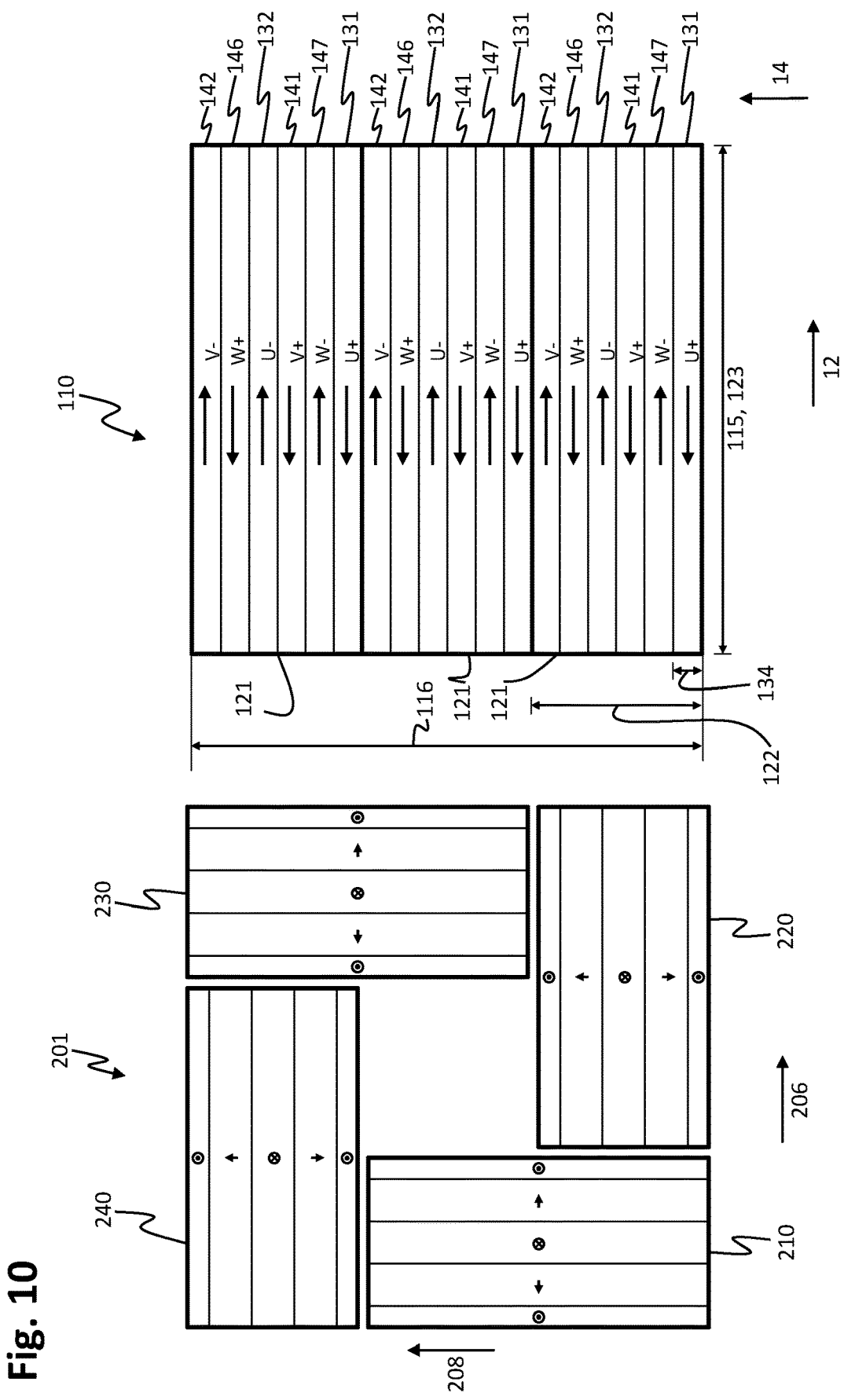
FIG. 10 depicts top views of the magnet arrangement and of the second stator segments of the stator sectors.

FIG. 10 shows top views of the magnet arrangement 201 and the second stator segments 121 of the first stator sector 110. Unless differences are described, the second, third and fourth stator sectors 112, 113, 114 are embodied identically to the first stator sector 110.

The second stator segments 121 have a segment width 122 in the second direction 14 which corresponds to the magnetizing period 219 and to the width 250 of the second and of the fourth magnet unit 220, 240 of the magnet arrangement 201 of the rotor 200. The second stator segments 121 have a segment length 123 in the first direction 12, which corresponds to three times the magnetizing period 219 and to three times the width 250 of the second and fourth magnet units 220, 240. One conductor period 134 of the conductor strips 125 of the second stator segments 121 of the first stator sector 110 corresponds to one sixth of the magnetizing period 219 of the second and fourth magnet units 220, 240. The conductor period 134 of the conductor strips 125 comprises a width of the conductor strips 125 themselves, i.e. the width of the metallization surfaces of the conductor strips 125, and a width of a gap provided between adjacent conductor strips 125 for electrical insulation. The conductor period 134 of the conductor strips 125 of the second stator segments 121 thus designates the distance between the center lines of adjacent conductor strips 125 oriented along the first direction 12.

The sector width 115 of the first stator sector 110 in the first direction 12 corresponds to three times the magnetizing period 219 of the second and fourth magnet units 220, 240. The sector length 116 of the first stator sector 110 in the second direction 14 corresponds to the sector width 115 and to three times the magnetizing period 219 of the second and fourth magnet units 220, 240.

The conductor strips 125 of each of the individual stator segments 120, 121 may be supplied with the drive currents independently from the conductor strips 125 of the other stator segments 120, 121. In particular, the drive currents in one of the stator segments 120, 121 do not necessarily depend on the drive currents in another of the stator segments 120, 121. In addition, the conductor strips 125 of one of the stator segments 120, 121 may be charged with drive currents, while the conductor strips 125 of another stator segment 120, 121, for example an adjacent one, are without current. The conductor strips 125 of different stator segments 120, 121 may, for example, be supplied with drive currents from separate power modules or from separate power generation units or, respectively, output stages of a power module of stator module 10.

The conductor strips 125 of the individual stator segments 120, 121 are each connected to independently energizable multi-phase systems. In particular, the conductor strips 125 of the stator segments 120, 121 are each connected to a three-phase system and the conductor strips 125 are supplied with a three-phase drive current. In this context, a first phase U, a second phase V and a third phase W of the drive currents have a phase offset of 120° from each other.

FIGS. 9 and 10 show the distribution of phases U, V, W on the conductor strips 125 of the first and second stator segments 120, 121. The stator segments 120, 121 each have a first forward conductor 131 and a first return conductor 132 for the first phases U of the drive currents, a second forward conductor 141 and a second return conductor 142 for the second phases V of the drive currents and a third forward conductor 146 and a third return conductor 147 for the third phases W of the drive currents. Since the individual stator segments 120, 121 may each be energized independently from one another, the drive currents by which the individual stator segments 120, 121 are charged may be different. In particular, the individual first phases U, by which the different stator segments 120, 121 are supplied, may be different. In addition, the individual second phases V, by which the various stator segments 120, 121 are supplied, and the individual third phases W, by which the various stator segments 120, 121 are supplied, may be different.

The forward conductors 131, 141, 146 and the return conductors 132, 142, 147 of one of the stator segments 120, 121 are each arranged next to one another along a width direction of the stator segments 120, 121. For the first stator segments 120 shown in FIG. 9, the width direction corresponds to the first direction 12. For the second stator segments 121 shown in FIG. 10, the width direction corresponds to the second direction 14.

The first forward conductor 131 is arranged on a first longitudinal side of each stator segment 120, 121. On the first stator segments 120, the first longitudinal side is oriented along the second direction 14 and on the second stator segments 121 along the first direction 12. Following the first forward conductor 131, the third return conductor 147, the second forward conductor 141, the first return conductor 132, the third forward conductor 146 and the second return conductor 142 are in this order arranged next to each other and adjacent to each other in the width direction of the stator segments 120, 121.

In the stator segments 120, 121, the first phase U is conducted on the first forward conductor 131 from a first side of the stator segments 120, 121 to a second side of the stator segments 120, 121 opposite the first side and on the first return conductor 132 from the second side to the first side. The second phase V is conducted on the second forward conductor 141 from the first side of the stator segments 120, 121 to the second side of the stator segments 120, 121 and on the second return conductor 142 from the second side to the first side. The third phase W is routed on the third forward conductor 146 from the first side of the stator segments 120, 121 to the second side of the stator segments 120, 121 and on the third return conductor 147 from the second side to the first side.

The phases U, V and W are thus fed in at the first side of the stator segments 120, 121 to the outgoing conductors 131, 141, 146 and on the second side of the stator segments 120, 121 to the return conductors 132, 142, 147. In addition, the phases U, V and W are each coupled out of the forward conductors 131, 141, 146 on the second side of the stator segments 120, 121 and out of the return conductors 132, 142, 147 on the first side of the stator segments 120, 121.

In the first stator segments 120, the first and second side are each aligned parallel to the first direction 12. The first and second side of the second stator segments 121 are aligned in parallel to the second direction 14.

The conductor strips 125 of the forward conductors 131, 141, 145 of the individual phases U, V, W are arranged shifted with regard to one another by half a magnetizing period 219. The conductor strips 125 of the return conductors 132, 142, 146 of the individual phases U, V, W are each arranged shifted with regard to one another by half a magnetizing period 219. The conductor strip 125 of the forward conductor 131 of the first phase U is arranged shifted by one third of the magnetizing period 219 with regard to the conductor strip 125 of the return conductor 132 of the first phase U. The conductor strip 125 of the forward conductor 141 of the second phase V is arranged shifted by one third of the magnetizing period 219 with regard to the conductor strip 125 of the return conductor 142 of the second phase V. The conductor strip 125 of the forward conductor 145 of the third phase W is arranged shifted by one third of the magnetizing period 219 with regard to the conductor strip 125 of the return conductor 146 of the third phase W. A travelling magnetic field may be generated by the three phases U, V, W of the drive current in the conductor strip 125 above the stator surface 11.

The first forward and return conductors 131, 132 of first stator segments 120 arranged on top of one another on several stator layers 104, 106, 108 may each be connected in series. Similarly, the second forward and return conductor 141, 142 and the third forward and return conductor 146, 147 of first stator segments 120 arranged on top of one another on several stator layers 104, 106, 108 may each be connected in series. In particular, the phases U, V, W may each be coupled into the forward conductors 131, 141, 146 of one of the first stator segments 120 on one of the stator layers 104, 106, 108, respectively, then all the forward and return conductors 131, 141, 146, 132, 142, 147 assigned to the relevant phase U, V, W, respectively, may pass through on all the stator layers 104, 106, 108 of the relevant first stator segment 120 and finally be brought together in a neutral point on one of the stator layers 104, 106, 108. In analogy to the first stator segments 120, the first forward and return conductor 131, 132, the second forward and return conductor 141, 142 and the third forward and return conductor 146, 147 of second stator segments 121 arranged on top of one another on several stator layers 104, 106, 108 may be connected in series, as well.

Figure 11:
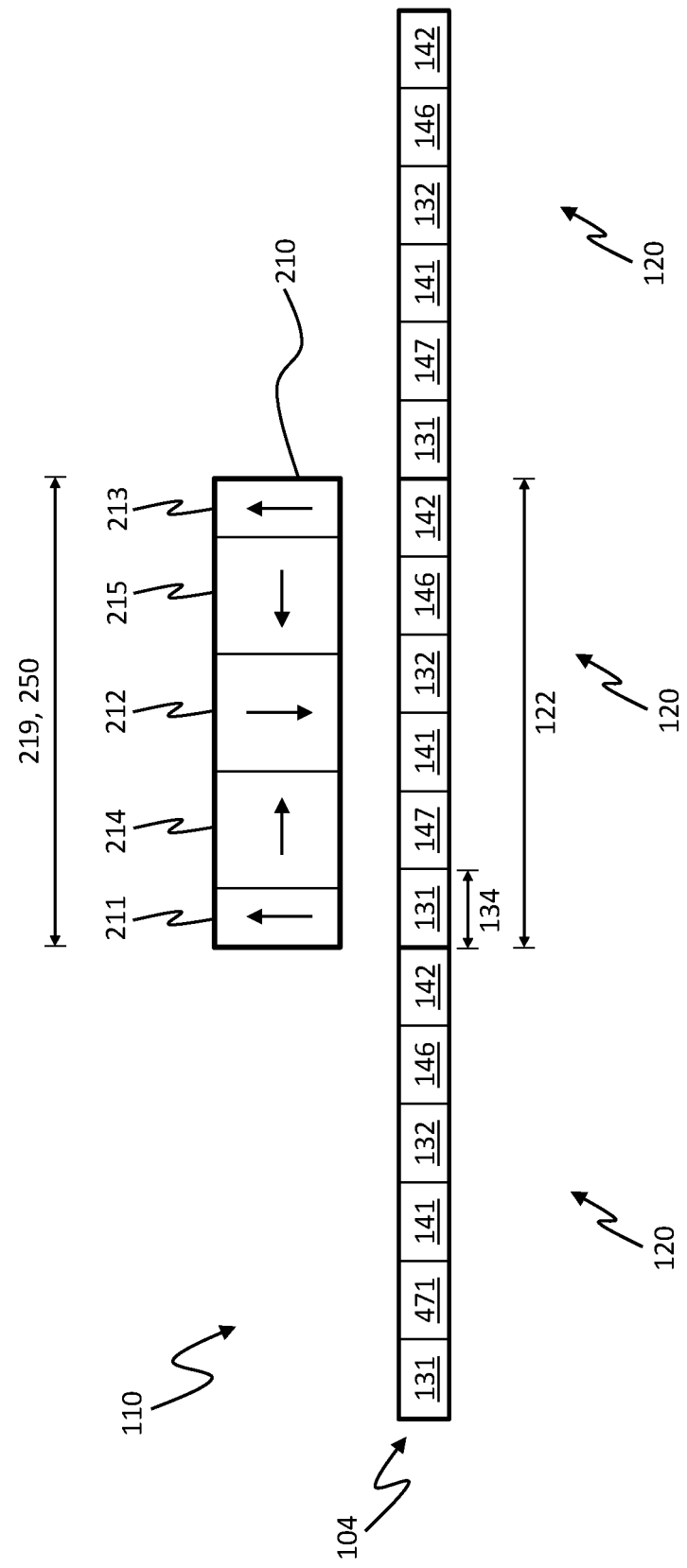
FIG. 11 shows lateral views of the magnet units of the magnet-net arrangement and of the stator sectors.

FIG. 11 shows a lateral view of the first magnet unit 210 and the first stator segments 120 of the first stator layer 104 of the first stator sector 110. Unless differences are described, the second, third and fourth magnet units 220, 230, 240, the second and further stator layers 106, 108, the second stator segments 121 as well as the second, third and fourth stator sectors 112, 113, 114 are constructed and arranged analogously.

The width 250 of the first magnet unit 210 and the segment width 122 of the first stator segments 120 correspond to the magnetizing period 219 of the first magnet unit 210. With the drive currents in the three-phase systems of the first stator segments 120 comprising the forward and return conductors 131, 141, 146, 132, 142, 147, a travelling magnetic field with an approximately harmonic progression is generated above the stator surface. The magnets 211, 212, 213, 214, 215 of the first magnet unit 210 align themselves in the generated travelling magnetic field. When the travelling field propagates along the first stator segments 120, the magnets 211, 212, 213, 214, 215 of the first magnet unit 210 follow the travelling field and a driving force is exerted on the rotor 200.

Figure 12:
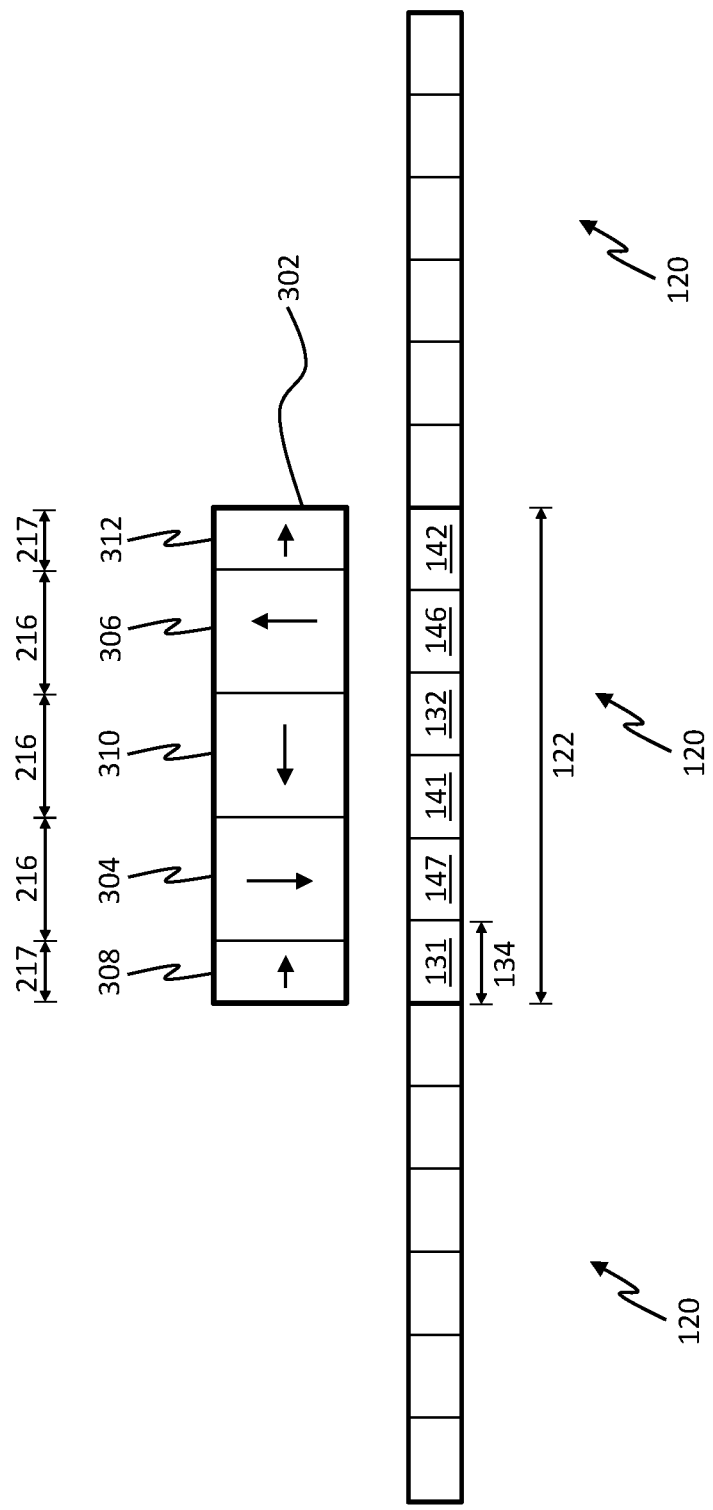
FIG. 12 shows lateral views of the stator sectors and another magnet unit.

FIG. 12 shows a lateral view of a further magnet unit 302 and three of the first stator segments 120. The further magnet unit 302 may be used instead of the first and third magnet units 210, 230 of magnet arrangement 201 and/or instead of the second and fourth magnet units 220, 240 of magnet arrangement 201. Unless differences are described in the following, the further magnet arrangement corresponds to the first and third magnet arrangement 210, 230 and/or to the second and fourth magnet arrangement 220, 240 with regard to its dimensions and orientation.

With regard to the first magnet unit 210 shown in FIG. 4, the further magnet arrangement 302 has a first compensating magnet 308 instead of the first drive magnet 211, a first drive magnet 304 instead of the first compensating magnet 214, a second compensating magnet 310 instead of the second drive magnet, a second drive magnet 306 instead of the second compensating magnet 215 and a third compensating magnet 312 instead of the third drive magnet 213.

The first drive magnet 304 has a magnetization which is oriented from the upper side of the rotor 200 to the bottom side of the rotor 200. The second drive magnet 306 has a magnetization oriented from the bottom side of the rotor 200 to the upper side of the rotor 200. The first compensating magnet 308 has a magnetization oriented towards the first drive magnet 304. The second compensating magnet 310 has a magnetization that is oriented from the second drive magnet 306 towards the first drive magnet 304. The third compensating magnet 312 has a magnetization that is oriented in the direction of the second drive magnet 306.

A magnetizing period of the further magnet unit 302 corresponds to the magnetizing period 219 of the magnet units 210, 220, 230, 240, wherein the magnetization of the magnets 308, 304, 310, 306, 312 of the further magnet unit 302 is shifted by a first magnet width 216 or, respectively, by a quarter of the magnetizing period 219, compared to the magnetization of the magnets 211, 214, 212, 215, 213 of the magnet units 210, 220, 230, 240. Instead of the first and the third magnet unit 210, 230, the rotor 200 may include the further magnet unit 302. Alternatively or additionally, the rotor 200 may include the further magnet unit 302 instead of the second and fourth magnet units 220, 240. A rotor designed in this way may be driven by a travelling field generated by the drive currents in the first stator segments 120 in the way described in conjunction with FIG. 11.

Figure 13:
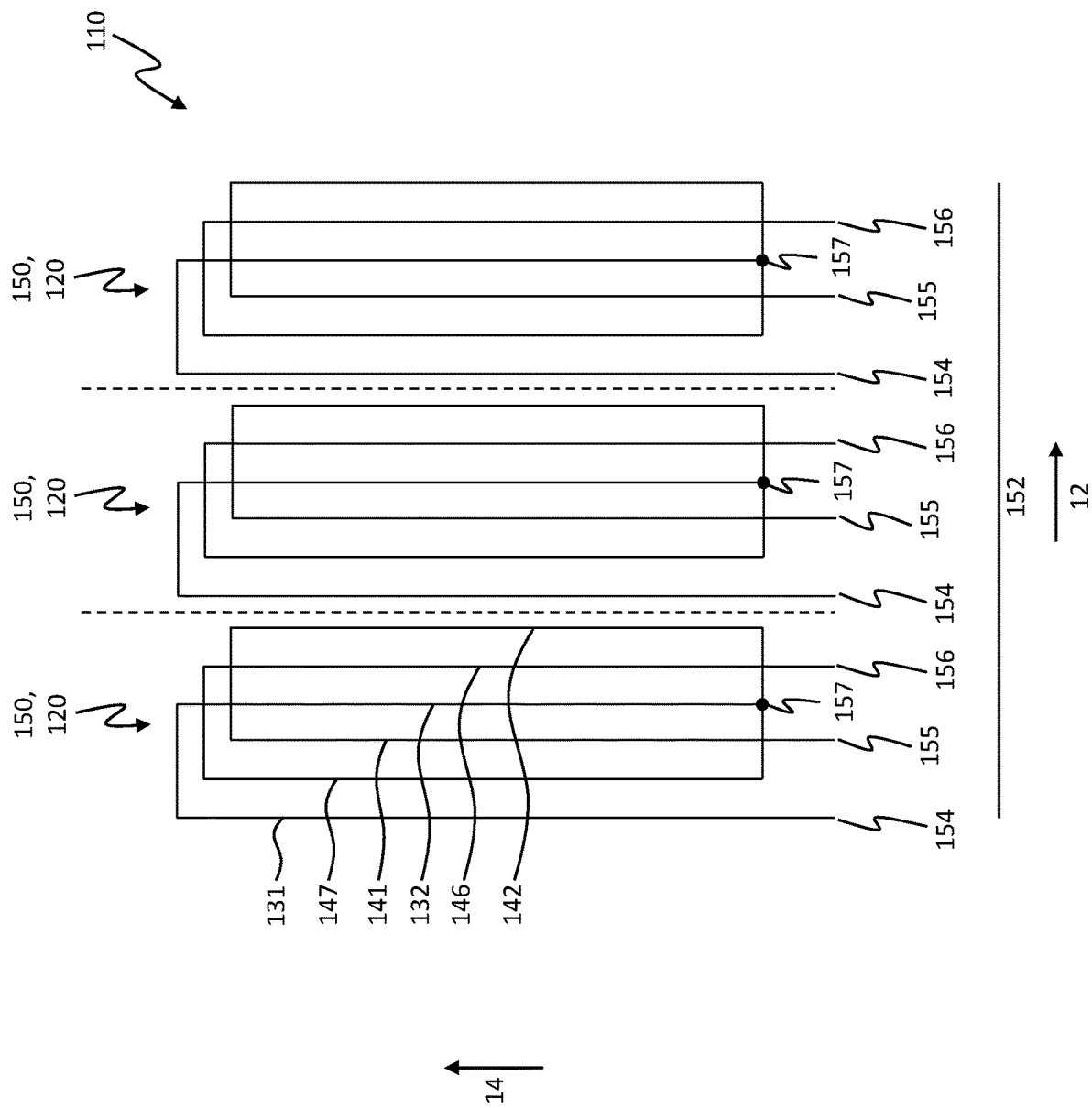
FIG. 13 is an equivalent-circuit diagram of three-phase systems of the first stator segments of the first stator sector.

FIG. 13 shows an equivalent-circuit diagram of the first stator segments 120 of the first stator sector 110. In the equivalent-circuit diagram shown in FIG. 13, all the conductor strips 125 of the first stator segments 120, which are arranged on top of one another and connected in series, are shown as a single conductor. In particular, the depicted first forward conductor 131 comprises all the conductors 131 of the first stator segments 120, which are arranged on top of one another and connected in series in different stator layers 104, 108, and the depicted first return conductor 132 comprises all first return conductors 132 of the first stator segments 120, which are arranged on top of one another connected in series in different stator layers 104, 108. Similarly, the depicted second forward conductor 141, second return conductor 142, third forward conductor 146 and third return conductor 147 each comprise all second forward conductors 141, second return conductor 142, third forward conductor 146 and third return conductor 147 of the first stator segments 120, respectively, arranged on top of one another and connected in series in different stator layers 104, 108.

The conductor strips 125, or the forward and return conductors 131, 132, 141, 142, 146, 147 of the individual first stator segments 110 are each connected to the first three-phase system 150. On a first side 152 of the individual first stator segments 120 oriented along the first direction 12, a first connection point 154 for feeding in the first phases U, a second connection point 155 for feeding in the second phases V and a third connection point 156 for feeding in the third phases W are respectively arranged. The first connection point 154 is connected to a first forward conductor 131 arranged in one of the stator layers 104, 108. The second connection point 155 is connected to a second forward conductor 141 arranged in one of the stator layers 104, 108. The third connection point 156 is connected to a third forward conductor 146 arranged in one of the stator layers 104, 108. In addition, a neutral point 157 is respectively arranged on the first side 152 of the individual first stator segments 120. In the neutral points 157, a first return conductor 132 of one of the stator layers 104, 108, a second return conductor 142 of one of the stator layers 104, 108 and a third return conductor 147 of one of the stator layers 104, 108 are respectively connected to one another.

Figure 14:
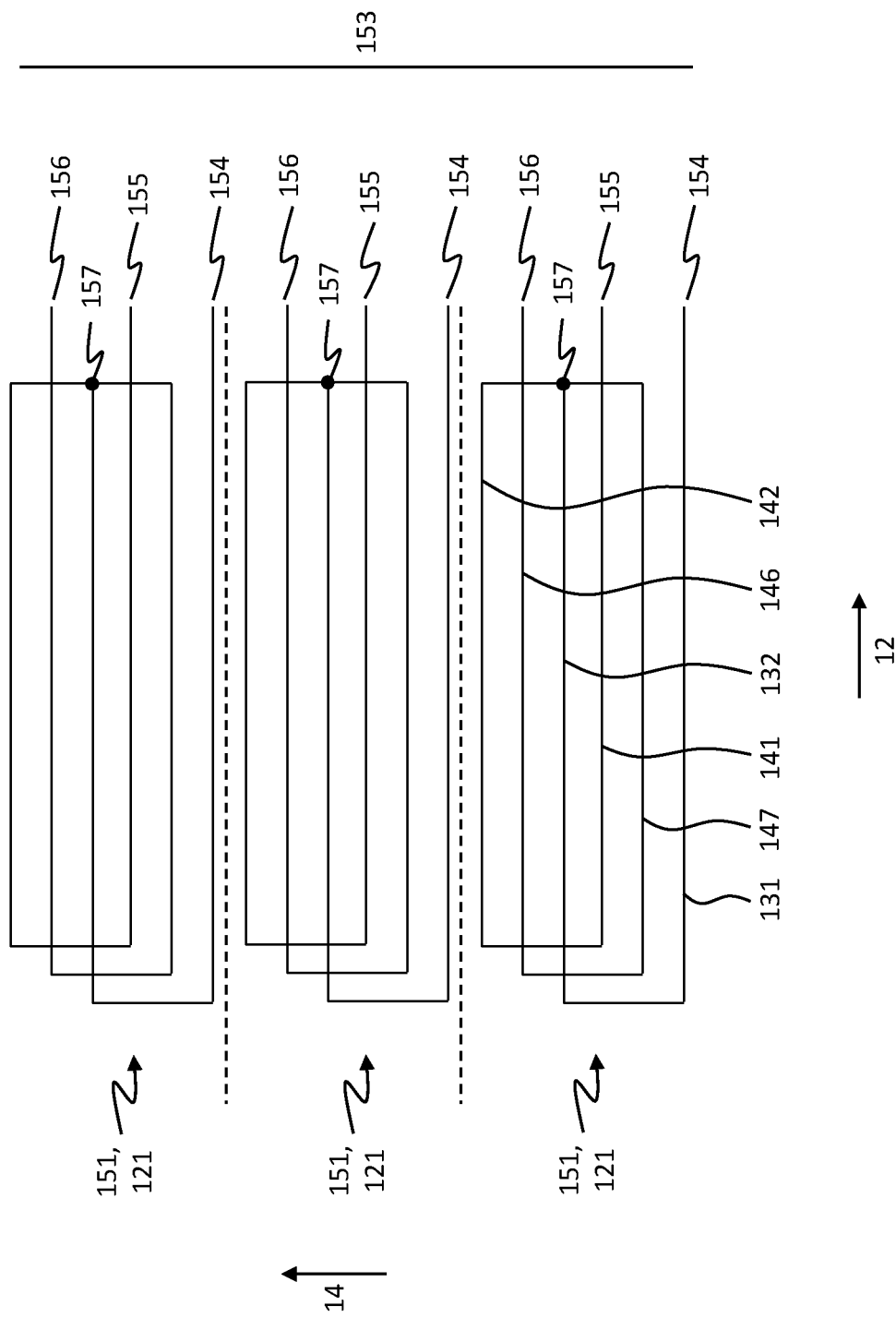
FIG. 14 is an equivalent-circuit diagram of three-phase systems of the second stator segments of the first stator sector.

FIG. 14 shows an equivalent-circuit diagram of the second stator segments 121 of the first stator sector 110. In the equivalent-circuit diagram shown in FIG. 14, as in the equivalent-circuit diagram of the first stator segments 120 shown in FIG. 13, all the conductor strips 125 of the second stator segments 121, which are arranged on top of one another and connected in series, are shown as a single conductor.

The conductor strips 125 or, respectively, the forward and return conductors 131, 132, 141, 142, 146, 147 of the second stator segments 121 are each connected to form second three-phase systems 151. On a first side 153 of the second stator segments 121, which is oriented along the second direction 14, a first connection point 154 for feeding in the first phases U, a second connection point 155 for feeding in the second phases V and a third connection point 156 for feeding in the third phases W are arranged. The first connection point 154 is connected to a first forward conductor 131 arranged in one of the stator layers 106, 108. The second connection point 155 is connected to a second forward conductor 141 arranged in one of the stator layers 106, 108. The third connection point 156 is connected to a third conductor 146 arranged in one of the stator layers 106, 108. In addition, a neutral point 157 is arranged on the first side 153 of each of the individual second stator segments 121. In each of the star points 157, a first return conductor 132 of one of the stator layers 106, 108, a second return conductor 142 of one of the stator layers 106, 108 and a third return conductor 147 of one of the stator layers 106, 108 are respectively connected to one another.

Figure 15:
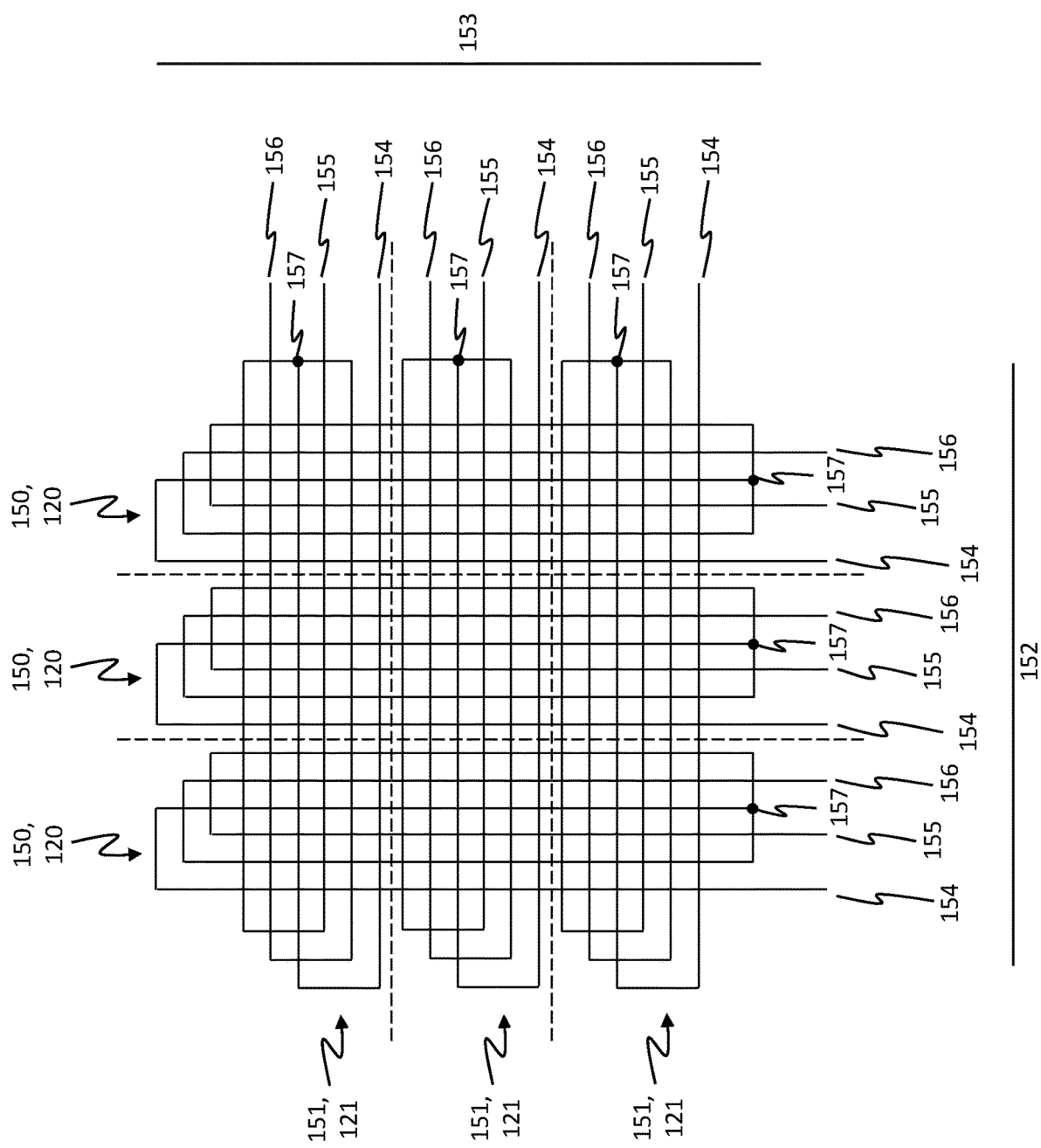
FIG. 15 shows an equivalent-circuit diagram of three-phase systems of the first and second stator segments of the first stator sector.

FIG. 15 shows an equivalent-circuit diagram of the first stator sector 110 with the first three-phase systems 150 described in FIG. 13 and representing the first stator segments 120 and the second three-phase systems 151 described in FIG. 14 and representing the second stator segments 121. The first three-phase systems 150 and the second three-phase systems 151 are arranged at a rotation of 90° with regard to each other. In particular, the first side 152 of the first stator segments 120 and the first side 153 of the second stator segments 121 are arranged perpendicular to each other.

A comparison of the depictions of the first stator sector 110 in FIG. 15 and FIG. 7 shows that the connection points 154, 155, 156 of the first stator segments 120 arranged along the first side 152 of the first stator segments 120 are arranged along the second inner edge 164 of the first stator sector 110. In addition, the connection points 154, 155, 156 of the second stator segments 121 arranged along the first side 153 of the second stator segments 121 are arranged along the first inner edge 163 of the first stator sector 110. In particular, the connection points 154, 155, 156 of the first stator segments 120 of the first stator sector 110 are arranged on the second inner edge 164 of the first stator sector 110 and the connection points 154, 155, 156 of the second stator segments 121 of the first stator sector 110 are arranged on the first inner edge 163 of the first stator sector 110.

The neutral points 157 of the first stator segments 120 are arranged on the second inner edge 164 of the first stator sector 110 and the neutral points 157 of the second stator segments 121 are arranged on the first inner edge 163 of the first stator sector 110.

Unless differences are described in the following, the equivalent-circuit diagrams of the second stator sector 112, the third stator sector 113 and the fourth stator sector 114 each correspond to the equivalent-circuit diagram of the first stator sector 110 shown in FIG. 15.

The first side 152 of the first stator segments 120 of the second stator sector 112 is arranged along the second inner edge 174 of the second stator sector 112. In addition, the first side 153 of the second stator segments 121 of the second stator sector 112 is arranged along the first inner edge 173 of the second stator sector 112. In particular, the connection points 154, 155, 156 of the first stator segments 120 of the second stator sector 112 are arranged on the second inner edge 174 of the second stator sector 112 and the connection points 154, 155, 156 of the second stator segments 121 of the second stator sector 112 are arranged on the first inner edge 173 of the second stator sector 112.

The neutral points 157 of the first stator segments 120 of the second stator sector 112 are arranged on the second inner edge 174 of the second stator sector 112 and the neutral points 157 of the second stator segments 121 of the second stator sector 112 are arranged on the first inner edge 173 of the second stator sector 112.

As the first inner edge 163 of the first stator sector 110 corresponds to the first inner edge 173 of the second stator sector 112 and the second inner edge 164 of the first stator sector 110 is flush with the second inner edge 174 of the second stator sector 112 on the second central line of the stator module 10, the equivalent-circuit diagram of the second stator sector 112 is arranged at the first inner edge 163 of the first stator sector 110 or, respectively, at the first side 153 of the second stator segments 121 of the first stator sector 110 in a mirrored manner with regard to the equivalent-circuit diagram of the first stator sector 110.

The first side 152 of the first stator segments 120 of the third stator sector 213 is arranged along the second inner edge 184 of the third stator sector 113. In addition, the first side 153 of the second stator segments 121 of the third stator sector 113 is arranged along the first inner edge 183 of the third stator sector 113. In particular, the connection points 154, 155, 156 of the first stator segments 120 of the third stator sector 113 are arranged on the second inner edge 184 of the third stator sector 113 and the connection points 154, 155, 156 of the second stator segments 121 of the third stator sector 113 are arranged on the first inner edge 183 of the third stator sector 113.

The neutral points 157 of the first stator segments 120 of the third stator sector 113 are arranged on the second inner edge 184 of the third stator sector 113 and the star points 157 of the second stator segments 121 of the third stator sector 113 are arranged on the first inner edge 183 of the third stator sector 113.

As the second inner edge 164 of the first stator sector 110 corresponds to the second inner edge 174 of the third stator sector 113 and the first inner edge 163 of the first stator sector 110 is flush with the first inner edge 173 of the third stator sector 113 on the first central line of the stator module 10, the equivalent-circuit diagram of the third stator sector 113 is arranged at the second inner edge 164 of the first stator sector 110 or, respectively, at the first side 152 of the first stator segments 120 of the first stator sector 110 in a mirrored manner with regard to the equivalent-circuit diagram of the first stator sector 110.

The first side 152 of the first stator segments 120 of the fourth stator sector 114 is arranged along the second inner edge 194 of the fourth stator sector 114. In addition, the first side 153 of the second stator segments 121 of the fourth stator sector 114 is arranged along the first inner edge 193 of the fourth stator sector 114. In particular, the connection points 154, 155, 156 of the first stator segments 120 of the fourth stator sector 114 are arranged on the second inner edge 194 of the fourth stator sector 114 and the connection points 154, 155, 156 of the second stator segments 121 of the fourth stator sector 114 are arranged on the first inner edge 193 of the fourth stator sector 114.

The neutral points 157 of the first stator segments 120 of the fourth stator sector 114 are arranged on the second inner edge 194 of the fourth stator sector 114 and the neutral points 157 of the second stator segments 121 of the fourth stator sector 114 are arranged on the first inner edge 193 of the fourth stator sector 114.

As the second inner edge 174 of the second stator sector 112 corresponds to the second inner edge 194 of the fourth stator sector 114 and the first inner edge 173 of the second stator sector 112 is flush with the first inner edge 193 of the fourth stator sector 114 on the second central line of the stator module 10, the equivalent-circuit diagram of the fourth stator sector 114 is arranged at the second inner edge 174 of the second stator sector 112 or, respectively, at the first side 152 of the first stator segments 120 of the second stator sector 112 in a mirrored manner with regard to the equivalent-circuit diagram of the second stator sector 112.

As the first inner edge 183 of the third stator sector 113 corresponds to the first inner edge 193 of the fourth stator sector 114 and the second inner edge 184 of the third stator sector 113 is flush with the second inner edge 194 of the fourth stator sector 114 on the first central line of the stator module 10, the equivalent-circuit diagram of the fourth stator sector 114 is arranged at the first inner edge 183 of the third stator sector 113 or, respectively, at the first side 153 of the second stator segments 121 of the third stator sector 113 in a mirrored manner with regard to the equivalent-circuit diagram of the third stator sector 113.

In total, the connection points 154, 155, 156 of the first stator segments 120 of the first, second, third and fourth stator sectors 110, 112, 113, 114 are thus located on the second central line of the stator module 10 and of the stator assembly 100. The connection points 154, 155, 156 of the second stator segments 121 of the first, second, third and fourth stator sectors 110, 112, 113, 114 are all located on the first central line of the stator module 10 and the stator assembly 100. The outer edges 21, 22, 23, 24 and the outer edges 161, 162 of the first stator sector 110, the outer edges 171, 172 of the second stator sector 112, the outer edges 181, 182 of the third stator sector 113 and the outer edges 191, 192 of the fourth stator sector 114 are all free of connection points 154, 155, 156 of the stator segments 120, 121.

The stator assembly 100 of stator module 10 has a contact structure 102 shown in FIG. 7 for contacting the first and second stator segments 120, 121. The contact structure 102 is cross-shaped and aligned along the first central line and the second central line of the stator module 10 and the stator assembly 100. The contact structure 102 thus rests on the boundaries of the stator sectors 110, 112, 113, 114 located in the first and second directions 12, 14 inside of the stator assembly 100 and the stator module 10. In particular, the connection points 154, 155, 156 of the first and second stator segments 120, 121 arranged on the first central line and on the second central line form the contact structure 102 for contacting the stator segments 120, 121.

The stator assembly 100 may be designed as a multi-layer unit, the stator layers 104, 106, 108 with the conductor strips 125 each being connected to one another via insulating intermediate layers. For example, the stator assembly 100 may be designed as a printed circuit board. In particular, the stator assembly 100 may be designed as a multi-layer printed circuit board, wherein the stator layers 104, 106, 108 are each arranged in different layers of the printed circuit board. The conductor strips 125 may have a thickness between 10 µm and 500 µm on the layers of the printed circuit board, in particular the conductor strips 125 may have a thickness between 50 µm and 250 µm.

In order to achieve an interconnection of the forward and return conductors 131, 141, 146, 132, 142, 147 of the three-phase systems 150, 151 of the stator segments 120, 121 according to the equivalent-circuit diagrams depicted in FIGS. 13, 14 and 15, the stator assembly 100 may have connecting structures in the area of the stator segments 120, 121. The connecting structures may be arranged on the conductor strips 125 or between the conductor strips 125 of the stator segments 120, 121.

Part of the connecting structures may be designed as horizontal connecting structures, which connect conductor strips 125 arranged in the individual stator segments 120, 121 within the same stator layer 104, 106, 108. The horizontal connecting structures are arranged on the same stator layer 104, 106, 108 as the conductor strips 125 to be connected. In the stator layers 104, 106, 108, the horizontal connecting structures may each extend in the direction 12, 14 in which the conductor strips 125 are arranged next to one another. In the first stator segments 120 in which the conductor strips 125 are extended along the second direction 14 and arranged side by side along the first direction 12, the horizontal connecting structures may run along the first direction 12. In the stator layers 104, 106, 108, in which the second stator segments 121 are arranged, the horizontal connecting structures may run along the second direction 14. The horizontal connecting structures can, similar to the conductor strips 125, be embodied as conductor paths or conductor-path sections of a layer of a circuit board of the stator assembly 100.

Part of the connecting structures may be embodied as vertical connecting structures which connect conductor strips 125 arranged in the individual stator segments 120, 121 in different stator layers 104, 106, 108. Via the vertical connecting structures, for example the first forward and return conductors 131, 132 for the first phases U of the drive currents may be connected in series. Likewise, the second forward and return conductors 141, 142 for the second phases V of the drive currents and the third forward and return conductors 146, 147 for the third phases W of the drive currents may be connected in series via the vertical connecting structures. The vertical connecting structures may be embodied as through-contacts or as vias (vertical interconnect access) between the individual stator layers 104, 106, 108 of the printed circuit board of stator assembly 100.

The schematic diagrams of the above-discussed figures show the conductor strips 125 as rectangular conductor structures extending over the entire segment length 123. The conductor strips 125 may be formed in regions of the stator assembly 100 that are remote from the connecting structures, as schematically shown in the previously discussed figures. However, the shape of the conductor strips 125 may also deviate from the schematic diagrams in the previously discussed figures, particularly in the area of the connecting structures. In particular, the conductor strips 125 of the first stator segments 120 in the region of the connecting structures may be narrower in the first direction 12 than in the regions remote from the connecting structures. Similarly, the conductor strips 125 of the second stator segments 121 may be narrower in the second direction 14 in the region of the connecting structures than in the regions remote from the connecting structures.

The conductor strips 125 of the first stator segments 120 may also be shorter in the second direction 14 than schematically shown in the previous figures. The conductor strips 125 of the second stator segments 121 may also be shorter in the first direction 12 than depicted in the previous figures. In particular, the conductor strips 125 of the individual first stator segments 120 in the second direction 14 need not always extend completely over the first stator segments 120, and the conductor strips 125 of the individual second stator segments 121 need not always extend completely over the second stator segments 121 in the second direction 14. Instead, the outer edges 161, 162, 171, 172, 181, 182, 191, 192 and the inner edges 163, 164, 173, 174, 183, 184, 193, 194 of the stator sectors 110, 112, 113, 114 may comprise horizontal connecting structures and/or vertical connecting structures.

The stator sectors 110, 112, 113, 114 are each quadratic and in each stator layer 104, 106, 108 either comprise three first stator segments 120 in the first direction 12, respectively, or three second stator segments 121 in the second direction 14, respectively. In alternative embodiments of the stator module 10, the stator sectors 110, 112, 113, 114 may also each be rectangular and comprise more than three first or second stator segments 120, 121 in the first and/or in the second direction 12, 14.

For example, the stator sectors 110, 112, 113, 114 may have a larger extension in the first direction 12 than in the second direction 14. In such a case, more than three first stator segments 120 may be arranged side by side in the first direction 12 in the stator layers 104, 108 in which the first stator segments 120 are arranged. The second stator segments 121 arranged in the other stator layers 106, 108 may then in the first direction 12 extend over all first stator segments 120 of the individual stator layers 104, 108 arranged next to each other. In particular, the second stator segments 121 may have a segment length in the first direction 12 which corresponds to the extension of all the first stator segments 120 of the individual stator layers 104, 108 of a stator sector which are arranged side by side.

The stator sectors 110, 112, 113, 114 may also have a greater extension in the second direction 14 than in the first direction 12. In such a case, more than three second stator segments 121 in each of the stator layers 106, 108 in which the second stator segments 121 may be arranged next to one another in the second direction 14 are arranged. The first stator segments 120 arranged in the other stator layers 104, 108 may then extend in the second direction 14 over all the second stator segments 121 of the individual stator layers 106, 108 arranged next to one another. In particular, the first stator segments 120 may have a segment length in the second direction 14 which corresponds to the extension of all second stator segments 121 of the individual stator layers 104, 108 of a stator sector, which are arranged next to one another.

The magnet units 210, 220, 230, 240 each comprise five magnets 211, 212, 213, 214, 215 and each have a width 250 which corresponds to the magnetizing period 219 of the magnet units 210, 220, 230, 240. Alternative embodiments of the magnet units 210, 220, 230, 240 may also have a width corresponding to an integer or half-integer multiple of the magnetizing period 219. Magnet arrangements with such magnet units are described in the publications mentioned in the introduction.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

TABLE 1

List of Reference Numerals 1 planar drive system
3 further planar drive system
10 stator module
11 stator area TABLE 1-continued List of Reference Numerals 12 first direction
14 second direction
15 third direction
16 connecting line
18 module housing
21 first outer edge
22 second outer edge
23 third outer edge
24 fourth outer edge
32 bottom side
33 side faces
100 stator assembly
102 contact structure
104 first stator layer
106 second stator layer
108 further stator layers
110 first stator sector
112 second stator sector
113 third stator sector
114 fourth stator sector
115 sector width
116 sector length
120 first stator segments
121 second stator segments
122 segment width
123 segment length
125 conductor strips
131 first forward conductor
132 first return conductor
134 conductor period
136 conductor length
138 conductor period
141 second forward conductor
142 second return conductor
146 third forward conductor
147 third return conductor
150 first three-phase systems
151 second three-phase systems
152 first side
153 first side
154 first connecting point
155 second connecting point
156 third connecting point
157 neutral point
161 first outer edge
162 second outer edge
163 first inner edge
164 second inner edge
171 first outer edge
172 second outer edge
173 first inner edge
174 second inner edge
181 first outer edge
182 second outer edge
183 first inner edge
184 second inner edge
191 first outer edge
192 second outer edge
193 first inner edge
194 second inner edge
200 rotor
201 magnet arrangement
202 width of magnet arrangement
203 length of magnet arrangement
204 spacers
205 fastening structure
206 first rotor direction
208 second rotor direction
209 free space
210 first magnet unit
211 first drive magnet
212 second drive magnet
213 third drive magnet
214 first compensating magnet
215 second compensating magnet
216 magnet width
217 magnet width
218 magnet length TABLE 1-continued List of Reference Numerals 219 magnetizing period
220 second magnet unit
230 third magnet unit
240 fourth magnet unit
250 width magnet unit
251 width direction
252 length of magnet unit
253 length direction
254 gap
256 gap width
260 outer longitudinal edge
261 outer transverse edge
262 inner longitudinal edge
263 inner transverse edge
200 rotor
302 further magnet unit
304 first drive magnet
306 second drive magnet
308 first compensating magnet
310 second compensating magnet
312 third compensating magnet

The invention claimed is:

1. A planar-drive system comprising:
a stator module, and
a rotor, wherein the rotor comprises a magnet arrangement, wherein the magnet arrangement comprises at least one first magnet unit and at least one second magnet unit;
wherein the first magnet unit comprises elongated drive magnets arranged side by side in a first rotor direction and extending along a second rotor direction oriented perpendicularly to the first rotor direction, and
wherein the second magnet unit comprises elongated drive magnets arranged side by side in the second rotor direction and extended along the first rotor direction;
the stator module comprising a stator assembly having at least one stator sector which, in a first stator layer, has first stator segments for interaction with the drive magnets of the first magnet unit and, in a second stator layer arranged below the first stator layer, second stator segments for interacting with the drive magnets of the second magnet unit,
wherein the first stator segments comprise elongated conductor strips arranged side by side along a first direction and extending along a second direction oriented perpendicularly to the first direction,
wherein the second stator segments comprise elongated conductor strips arranged side by side along the second direction and extending along the first direction,
wherein the conductor strips of the individual stator segments may each be energized independently from the conductor strips of the remaining stator segments,
wherein the first stator segments of the stator sector in the second direction extend over all second stator segments of the stator sector arranged side by side,
wherein the second stator segments of the stator sector in the first direction extend over all the first stator segments of the stator sector arranged side by side,
wherein a sector width of the stator sector is in the first direction smaller than an extension of the magnet arrangement in the first rotor direction, and
wherein a sector length of the stator sector is in the second direction smaller than an extension of the magnet arrangement in the second rotor direction.

2. The planar-drive system according to claim 1, wherein the stator sector in the first stator layer consists of three first stator segments which may be energized independently from one another and in the second stator layer consists of three second stator segments which may be energized independently from one another.

3. The planar-drive system according to claim 1,
wherein a segment width of the first stator segments in the first direction corresponds to a magnetizing period of the first magnet unit, and
wherein a segment width of the second stator segments in the second direction corresponds to a magnetizing period of the second magnet unit.

4. The planar-drive system according to claim 1,
wherein the segment width of the first stator segments is in the second direction three times the magnetizing period of the first magnet unit, and
wherein the segment width of the second stator segments is in the first direction three times the magnetizing period of the second magnet unit.

5. The planar-drive system according to claim 1,
wherein a conductor period of the conductor strips of the first stator segments corresponds to a sixth of a magnetizing period of the first magnet unit, and
wherein a conductor period of the conductor strips of the second stator segments corresponds to a sixth of a magnetizing period of the second magnet unit.

6. The planar-drive system according to claim 1, wherein an extension of the first magnet unit in the first rotor direction corresponds to a magnetizing period of the first magnet unit and an extension of the second magnet unit in the second rotor direction corresponds to a magnetizing period of the second magnet unit.

7. The planar-drive system according to claim 1, wherein the stator sector is square so that the sector width of the stator sector in the first direction corresponds to the sector length of the stator sector in the second direction.

8. The planar-drive system according to claim 1, wherein an outer edge of the stator sector is flush with an outer edge of the stator module, so that the stator sector and a stator sector being flush with an outer edge of the further stator module arranged beside the stator module may be arranged adjacent to one another.

9. The planar-drive system according to claim 1,
wherein the stator assembly comprises three further stator sectors,
wherein in the first direction and in the second direction the stator sector and the further stator sectors of the stator assembly are each arranged in two rows next to one another and adjoining one another, and
wherein the further stator sectors in the first and second stator layers each comprise further ones of the first and second stator segments respectively.

10. A stator module for driving a rotor, which comprises:
a first magnet unit having elongate drive magnets arranged side by side in a first rotor direction and extending along a second rotor direction oriented perpendicularly to the first rotor direction, and
a second magnet unit with elongated drive magnets arranged side by side in the second rotor direction and extending along the first rotor direction;
wherein the stator module comprises a stator assembly, the stator assembly comprising a first stator sector, a second stator sector, a third stator sector and a fourth stator sector,
the stator sectors each having first stator segments in a first stator layer of the stator assembly for interaction with the drive magnets of the first magnet unit and, in a second stator layer of the stator assembly arranged below the first stator layer, second stator segments for interacting with the drive magnets of the second magnet unit;

wherein the first stator segments comprise elongated conductor strips arranged side by side along a first direction and extending along a second direction oriented perpendicularly to the first direction, wherein the second stator segments comprise elongated conductor strips arranged side by side along the second direction and extending along the first direction, wherein the conductor strips of the individual stator segments may each be energized independently from the conductor strips of the remaining stator segments, wherein the first stator segments of the first, second, third and fourth stator sectors in the second direction respectively extending over the second stator segments of the first, second, third and fourth stator sectors arranged side by side, wherein the second stator segments of the first, second, third and fourth stator sectors in the first direction respectively extend over all the first stator segments of the first, second, third and fourth stator sectors arranged side by side, wherein the stator sectors in the first stator layer consist of three first stator segments which may be energized independently from one another, and in the second stator layer consisting of three second stator segments which may be energized independently from one another, wherein a sector width of the stator sectors is in the first direction smaller than an extension of a magnet arrangement of the rotor, comprising the first and second magnet units in the first rotor direction, and wherein a sector length of the stator sectors is in the second direction smaller than an extension of the magnet arrangement in the second rotor direction.

11. The stator module according to claim 10,
wherein the first stator segments each comprise six conductor strips arranged side by side, and
wherein the second stator segments each comprise six conductor strips arranged side by side.

12. The stator module according to claim 10,
wherein the conductor strips of the first stator segments are respectively connected to form three-phase systems each having a shared neutral point for each first stator segment,
wherein the conductor strips of the second stator segments are respectively connected to form three-phase systems each having a shared neutral point for each second stator segment, and
wherein the three-phase systems of the individual first and second stator segments may be energized independently from one another.

13. The stator module according claim 10,
wherein an outer edge of the first stator sector is flush with a first outer edge of the stator module,
wherein a further outer edge of the first stator sector is flush with a second outer edge of the stator module,
wherein an outer edge of the second stator sector is flush with the first outer edge of the stator module, and
wherein an outer edge of the third stator sector is flush with the second outer edge of the stator module.

14. The stator module according to claim 13,
wherein the stator assembly consists of the first, second, third and fourth stator sectors,
wherein a further outer edge of the third stator sector and an outer edge of the fourth stator sector are flush with a third outer edge of the stator module, and
wherein a further outer edge of the second stator sector and a further outer edge of the fourth stator sector are flush with a fourth outer edge of the stator module.

15. The stator module according to claim 10,
wherein a segment width of the first stator segments in the first direction corresponds to a magnetizing period of the first magnet unit, and
wherein a segment width of the second stator segments in the second direction corresponds to a magnetizing period of the second magnet unit.

16. A planar-drive system comprising:
a stator module, and
a rotor, wherein the rotor comprises a magnet arrangement, wherein the magnet arrangement comprises at least one first magnet unit and at least one second magnet unit;
wherein the first magnet unit comprises elongated drive magnets arranged side by side in a first rotor direction and extending along a second rotor direction oriented perpendicularly to the first rotor direction, and
wherein the second magnet unit comprises elongated drive magnets arranged side by side in the second rotor direction and extended along the first rotor direction;
the stator module comprising a stator assembly having at least one stator sector which, in a first stator layer, has first stator segments for interaction with the drive magnets of the first magnet unit and, in a second stator layer arranged below the first stator layer, second stator segments for interacting with the drive magnets of the second magnet unit,
wherein the first stator segments comprise elongated conductor strips arranged side by side along a first direction and extending along a second direction oriented perpendicularly to the first direction,
wherein the second stator segments comprise elongated conductor strips arranged side by side along the second direction and extending along the first direction,
wherein the conductor strips of the individual stator segments may each be energized independently from the conductor strips of the remaining stator segments,
wherein the first stator segments of the stator sector in the second direction extend over all second stator segments of the stator sector arranged side by side,
wherein the second stator segments of the stator sector in the first direction extend over all the first stator segments of the stator sector arranged side by side,
wherein a sector width of the stator sector is in the first direction smaller than an extension of the magnet arrangement in the first rotor direction,
wherein a sector length of the stator sector is in the second direction smaller than an extension of the magnet arrangement in the second rotor direction,
wherein the stator sector in the first stator layer consists of three first stator segments which may be energized independently from one another and in the second stator layer consists of three second stator segments which may be energized independently from one another,
wherein a segment width of the first stator segments in the first direction corresponds to a magnetizing period of the first magnet unit,
wherein a segment width of the second stator segments in the second direction corresponds to a magnetizing period of the second magnet unit, wherein the segment width of the first stator segments is in the second direction three times the magnetizing period of the first magnet unit, and wherein the segment width of the second stator segments is in the first direction three times the magnetizing period of the second magnet unit.

17. The planar-drive system according to claim 16, wherein a conductor period of the conductor strips of the first stator segments corresponds to a sixth of a magnetizing period of the first magnet unit, and wherein a conductor period of the conductor strips of the second stator segments corresponds to a sixth of a magnetizing period of the second magnet unit.

18. The planar-drive system according claim 16, wherein an extension of the first magnet unit in the first rotor direction corresponds to a magnetizing period of the first magnet unit and an extension of the second magnet unit in the second rotor direction corresponds to a magnetizing period of the second magnet unit.

19. The planar-drive system according to claim 16, wherein the stator sector is square so that the sector width of the stator sector in the first direction corresponds to the sector length of the stator sector in the second direction.

* * * * *